US006425130B2

(12) United States Patent
Asai et al.

(10) Patent No.: US 6,425,130 B2
(45) Date of Patent: Jul. 23, 2002

(54) VIDEO NETWORK SERVER FOR DISTRIBUTING SOUND AND VIDEO IMAGE INFORMATION TO A PLURALITY OF TERMINALS

(75) Inventors: Rieko Asai, Hirakatashi; Takashi Akiyoshi, Sakaisi, both of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 08/881,416

(22) Filed: Jun. 24, 1997

(30) Foreign Application Priority Data

Jun. 25, 1996 (JP) .............................................. 8-164686

(51) Int. Cl.[7] .............................................. H04N 7/173
(52) U.S. Cl. ...................... 725/91; 370/486; 370/487; 709/230; 709/231; 709/227; 709/228
(58) Field of Search ................................ 709/217, 218, 709/219, 230, 231, 227, 228; 348/12, 13, 7, 6; 455/5.1, 6.1, 4.2; 725/91, 94, 95, 96, 98, 103; 370/486, 487

(56) References Cited

U.S. PATENT DOCUMENTS 5,764,972 A * 6/1998 Crouse et al. ............... 395/601
5,768,681 A * 6/1998 Dan et al. .................... 455/5.1

* cited by examiner

Primary Examiner—Andrew Faile
Assistant Examiner—Ngoc Vu
(74) Attorney, Agent, or Firm—Parkhurst & Wendel, L.L.P

(57) ABSTRACT

A video network server which distributes sound/video image information to a plurality of terminals comprises a network system status obtaining section for obtaining status of a video network system including a video network server, a network and terminals; a network system status decision section for deciding the status of the video network system which is obtained by the network system status obtaining means; a data obtaining method selecting means for selecting a data obtaining method on the basis of a result which is decided by the network system status decision means; and a data obtaining method switching means for performing switching of a data obtaining method when the method of obtaining data which is selected by the data obtaining method selecting means is different from a method of obtaining data at present.

5 Claims, 35 Drawing Sheets

Fig.30 present time slot period : 1333msec optimum data transfer rate : 3.0Mbps number of terminal in operation : n

VIDEO NETWORK SERVER FOR DISTRIBUTING SOUND AND VIDEO IMAGE INFORMATION TO A PLURALITY OF TERMINALS

FIELD OF THE INVENTION

The present invention relates to a video network server, and more particularly, to a video network server which selects a data transfer method or sets various parameters in accordance with status of a network system in a video network system for distributing sound/video image information to terminals.

BACKGROUND OF THE INVENTION

In recent years, with a progress of an image compression technology or a high-speed digital network technology, a wide variety of multimedia systems are increasingly constructed. In order to construct a multimedia network system by combining various equipments using a general computer and operate it smoothly, there is a need for a function for setting various parameters such as a time slot period and a time slot size or a number of allowable terminals according to status of the system and a function for reconstructing the system by resetting these various parameters in accordance with change of status.

A description is given of time slot management of the video server which decides setting of parameters with reference to FIG. 35. Since it is difficult to distribute data to each terminal in a given ratio in a network system including a plurality of terminals only by reading and transferring the data sequentially, particularly in the case by using motion picture data of a large capacity, a time slot management method wherein data is sent to each terminal periodically for a given time is generally employed in the video network server. As shown in FIG. 35, the video server divides a given time interval, i.e, a time slot period uniformly and allocates the divided given time interval to each terminal. The time allocated to each terminal in a time slot period is a time slot size. The video server reads and transfers data to each terminal for each time slot size, thereby distributing data to a plurality of terminals in a given ratio. As shown in FIG. 35, data is sequentially read and transferred for each time slot size as follows: data A1 to a terminal A→data B1 to a terminal B→data C1 to a terminal C (one time slot period)→data A2 to the terminal A . . . . Conventionally, a time slot period and a time slot size are decided when parameters are set in the video server and then, on the basis of the time slot period and the time slot size, a number of allowable terminals or a response speed, i.e., the other parameters are decided.

A description is given of a function for setting various parameters for operating a system in a video net work server which distributes sound/video image information or the like to a plurality of terminals employed conventionally with reference to figures.

FIG. 34 is a diagram illustrating a prior art video network server. In the figure, a parameter computing means 901 is for computing parameters in accordance with a construction of a system. The construction of the system includes a number or performance of storage devices such as connected disks, or a capacity of a memory mounted in the system, for example. A parameter computation information holding means 902 is for holding information with which the parameter computing means 901 computes parameters. A parameter setting means 903 is for setting the parameters computed by the parameter computing means 901 in the system.

Actually, various components such as a system construction checking means for checking the construction of the system are necessary, and are dispensed with herein.

The prior art server constructed above operates as follows in setting parameters. The parameter computation information holding means 902 holds information as to the construction of the system such as a type and a number of disks as storage devices or a capacity of a memory, or information for setting parameters such as a formula for computing parameters on the basis of the former information. The parameter computing means 901 computes parameters such as the time slot period and the time slot size in the time slot management mentioned above or the number of allowable terminals or the transfer speed in view of performance in accordance with the construction of the system, on the basis of the information which is held by the parameter computation information holding means 902. The parameter setting means 903 sets the parameters which are computed by the parameter computing means 903 in the system.

The video network system is operated according to thus set parameters, and when the construction and status of the system change, parameters are reset following the procedure.

In the prior art server, when parameters are computed or set, it is possible to compute and set appropriate parameters in view of factors determined by the constructions of the system such as the number or performance of disks, but it is difficult to compute and set appropriate parameters in view of external and dynamic factors such as change of network operating form or change of network traffic (congestion). Therefore, if performance of the system with parameters initially set is degraded due to changes of the external factors, the system is operated without changing initialization, so that status of the network becomes worse than predicted and the server is overloaded, causing damaging effects on use of data. On the other hand, when status of the network is more preferable than predicted, performance of the system is degraded without making the best use of a reserve power of the system.

In the former case in which status of the system becomes worse than predicted, when traffic of the network increases or the network server is overloaded in reproducing motion picture data at the terminal, discontinuity of sound of data occurs or response of the server becomes worse, causing stop of reproduction.

In this case, since response of the server is worse than predicted, changing parameters of the system which decides response speed such as making the time slot period shorter than normal, limiting the number of allowable terminals must be performed, or when operating status is worse than described above, which is difficult to cope with by changing parameters, it is difficult to avoid the adverse effects without taking actions for reducing load of the server, such as performing switching of a method of obtaining data so as to transfer all data to terminals and reproduce the data at the terminals. As the method of obtaining data, a method wherein terminals receive data which is reproduced by the server itself using NFS protocol, for example, is less burdensome and desirable to the terminals. However, when status of the server or the network is worse and the adverse effects occur, it is desirable to transfer all data to the terminals and reproduce the data at the terminals using FTP protocol, since discontinuity of data is avoided.

In the latter case, the reserve power of the server is not made the best use of if status of the network is more preferable than predicted. For example, when the system is set to transfer all motion picture data to the terminals and reproduce the data at the terminals or the number of allowable terminals is limited severely allowing for congestion of the network or load of the server, it is impossible to reproduce data or to increase terminals to which data is supplied, with the server less overloaded than predicted. In another case, assuming that data requiring a fast transfer rate is used, when a time slot period is set according to its required transfer rate, use of data of required transfer rate which is lower than predicted causes time of no use in a time slot.

In the prior art server, in order to improve the above-described problem which may occur when status of the system changes, the user must interrupt operation of the system consciously and check its status, and then change parameters or various conditions.

In some cases, the user demands that discontinuity of sound or stop of reproduction be avoided with a number of terminals limited, while the user demands that many terminals be used with discontinuity of sound or stop of reproduction occurring in some degree. However, parameters cannot be changed with flexibility depending on allowable qualities in the prior art server system.

SUMMARY OF THE INVENTION

It is an object of the present invention to provide a video network work server wherein switching of a method of obtaining data can be performed in accordance with busy status of the network or status of the server in operating the system, thereby data is transferred with reliability and a reproduction quality is improved.

It is another object of the present invention to provide a video network server wherein parameters are changed and a limited number of terminals which the system may allow is changed in accordance with busy status of the network or status of the server in operating the system, thereby data is transferred with reliability and a reproduction quality is improved.

It is still another object of the present invention to provide a video network server wherein a number of allowable terminals can be set in accordance with allowable qualities of data specified by the user in addition to change of parameters according to status of the system, thereby it is possible to set the system with flexibility in operating the system.

It is a further object of the present invention to provide a video network server wherein parameters of the system can be changed and time slot management can be adjusted depending on a transfer rate of data which is requested by each terminal in operating the system, thereby performance of the system is improved.

Other objects and advantages of the invention will become apparent from the detailed description that follows. The detailed description and specific embodiments described are provided only for illustration since various additions and modifications within the scope of the invention will be apparent to those of skill in the prior art from the detailed description.

According to a first aspect of the present invention, a video network server which distributes sound/video image information to a plurality of terminals comprises a network system status obtaining section for obtaining status of a network system including a network server, a network and terminals; a network system status decision section for deciding the status of the network system which is obtained by the network system status obtaining section; a data obtaining method selecting means for selecting a data obtaining method on the basis of a result which is decided by the network system status decision section; and a data obtaining method switching means for performing switching of a data obtaining method when the data obtaining method which is selected by the data obtaining method selecting means is different from a data obtaining method at present.

According to a second aspect of the present invention, the video network server according to the first aspect includes a network status obtaining means for obtaining status of the network as the network system status obtaining section and a network status decision means for deciding the status of the network which is obtained by the network status obtaining means as the network system status decision section.

According to a third aspect of the present invention, the video network server according to the first aspect includes a network server information obtaining means for obtaining information of the network server as the network system status obtaining section and a network server status decision means for deciding status of the network server on the basis of the information of the network server which is obtained by the network server information obtaining means as the network system status decision section.

According to a fourth aspect of the present invention, a video network server which distributes sound/video image information to a plurality of terminals comprise a network system status obtaining section for obtaining status of a network system including a network server, a network and terminals; a network system status decision section for deciding the status of the network system which is obtained by the network system status obtaining section; a parameter computing means for computing parameters including a number of terminals which the system may allow on the basis of a result which is decided by the network system status decision section; and a parameter setting means for setting parameters of the system on the basis of a result which is computed by the parameter computing means.

According to a fifth aspect of the present invention, the video network server according to the fourth aspect includes a network status obtaining means for obtaining status of the network as the network system status obtaining section and a network status decision means for deciding the status of the network which is obtained by the network status obtaining means as the network system status decision section.

According to a sixth aspect of the present invention, the video network server according to the fourth aspect includes a network server information obtaining means for obtaining information of the network server as the network system status obtaining section and a network server status decision means for deciding status of the network server on the basis of the information of the network server which is obtained by the network server information obtaining means as the network system status decision section.

According to a seventh aspect of the present invention, the video network server according to the fourth aspect further comprises an allowable quality specifying means for specifying an allowable range of a quality of reproduced data, the parameter computing means computing parameters of the system including a number of terminals which the system may allow on the basis of the allowable range specified by the allowable quality specifying means.

According to an eighth aspect of the present invention, the video network server according to the seventh aspect includes a network status obtaining means for obtaining status of the network as the network system status obtaining section and a network status decision means for deciding the status of the network which is obtained by the network status obtaining means as the network system status decision section.

According to a ninth aspect of the present invention, the video network server according to the seventh aspect includes a network server information obtaining means for obtaining information of the network server as the network system status obtaining section and a network server status decision means for deciding status of the network server on the basis of the information of the network server which is obtained by the network server information obtaining means as the network system status decision section.

According to a tenth aspect of the present invention, a video network server which distributes sound/video image information to a plurality of terminals comprises a data storage means for storing data; a buffer memory for temporarily storing data to be transferred; a parameter computing means for allocating a given time interval in a period which is allocated for a terminal for another terminal when it is possible to read data which is requested by the terminal in a time that is less than a given time interval in a predetermined period; a data prereading means for reading the data which is requested by the terminal for a given time interval in a period which is allocated by the parameter computing means from the data storage means and outputting the data to the buffer memory; and a data feeding means for feeding the data which is output to the buffer memory to the terminal.

According to an eleventh aspect of the present invention, the video network server according to the tenth aspect wherein, when it is possible to read data which is requested by a terminal in half of a given time interval in a predetermined period, the parameter computing means allocates a given time for the terminal every two periods and a given time interval in a remaining period for another terminal.

BRIEF DESCRIPTION OF THE DRAWINGS

FIG. 30 is a diagram illustrating parameters of a system preset in the video network server according to the tenth embodiment of the present invention.

DETAILED DESCRIPTION OF THE PREFERRED EMBODIMENTS

Embodiment 1

A video network server according to a first embodiment of the present invention has a capability of performing switching of a data transfer method depending on status of a network.

Figure 1:
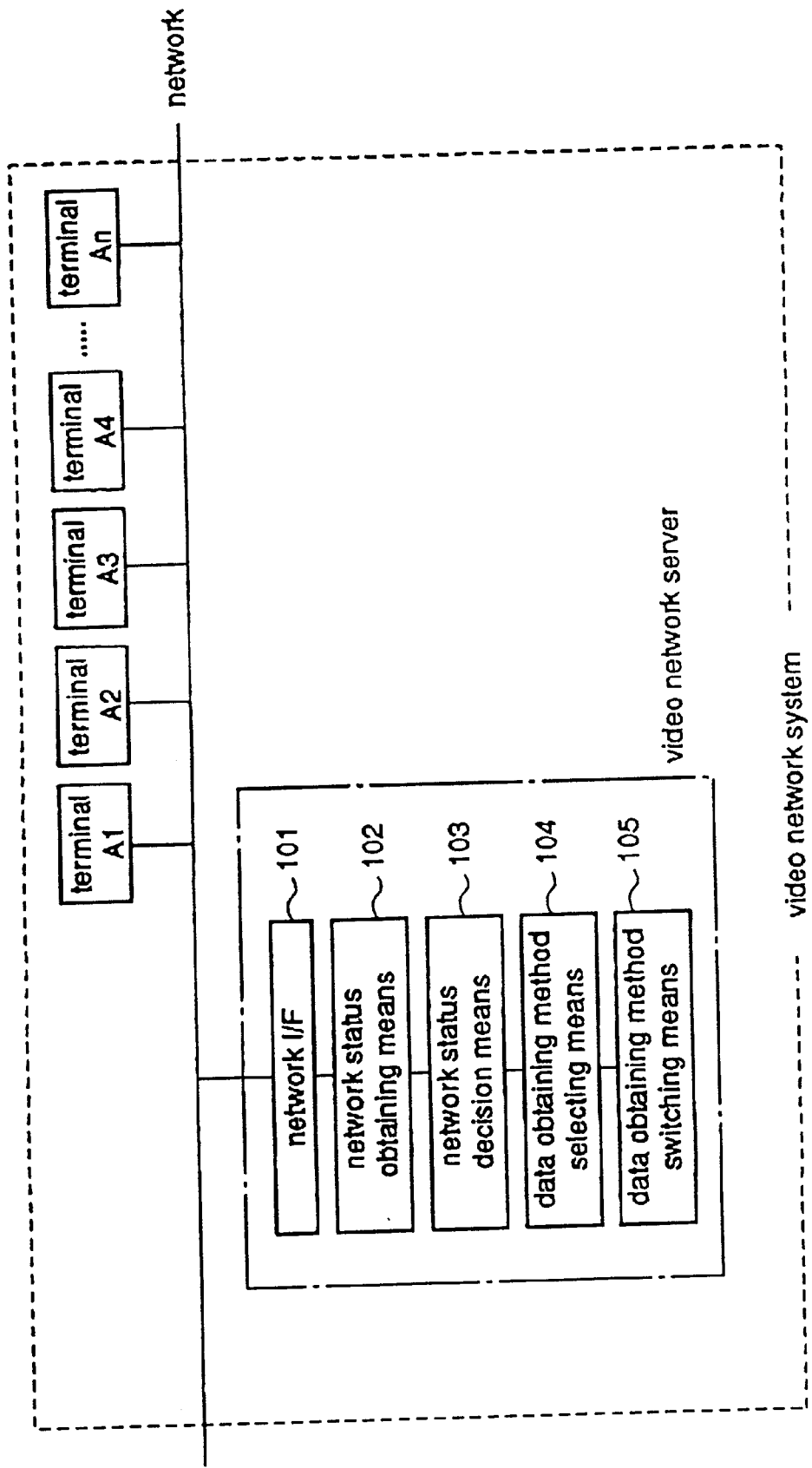
FIG. 1 is a block diagram illustrating a video server according to a first embodiment of the present invention.
Figure 2:
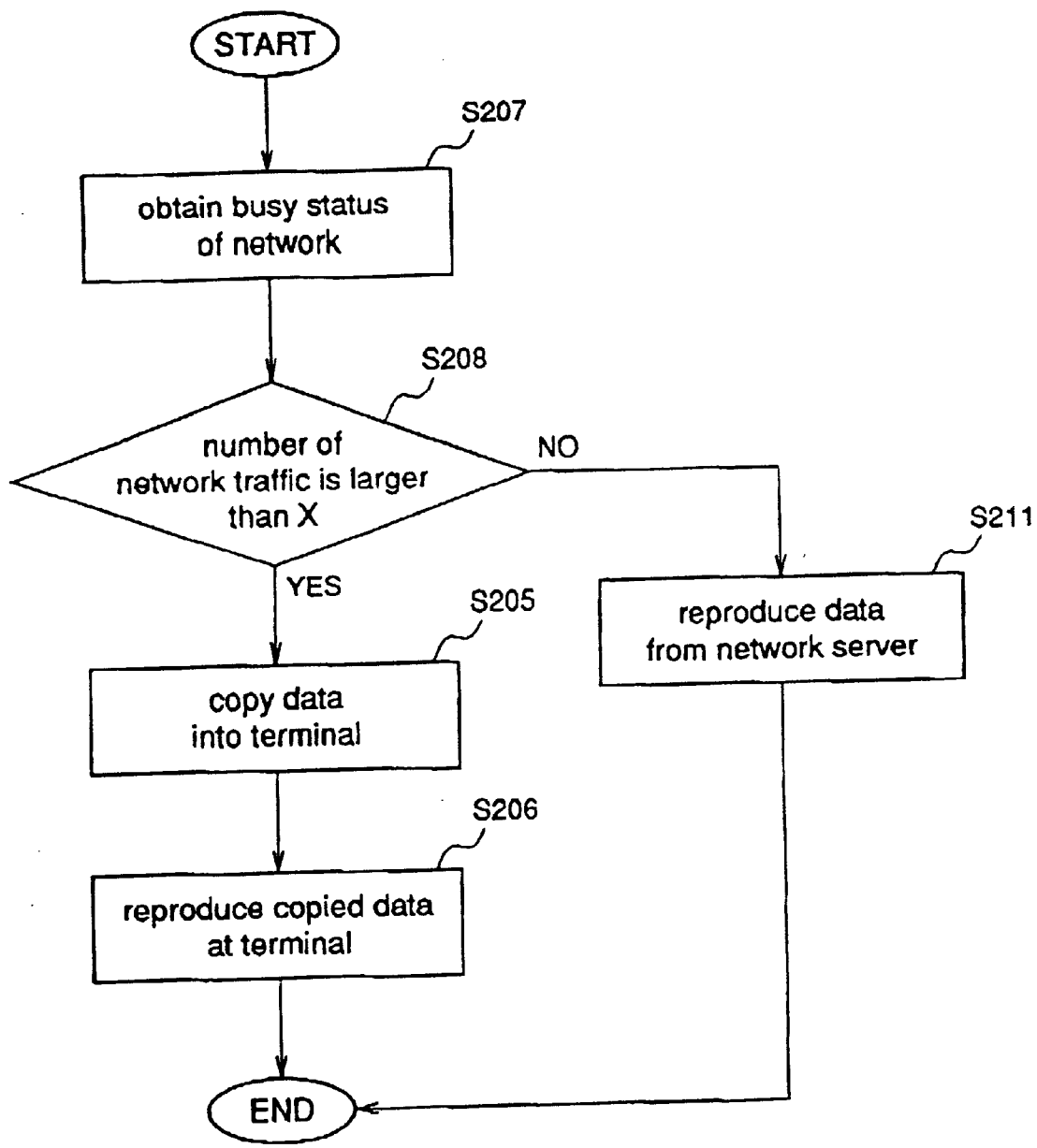
FIG. 2 is a flow chart illustrating a reproducing operation of the video network server.

FIG. 1 is a block diagram illustrating a video network server according to a first embodiment of the present invention. In the figure, reference numeral 101 designates a network interface through which the video network server is connected to a network. A network status obtaining means 102 is for obtaining status of the network. A network status decision means 103 is for deciding the status of the network which is obtained by the network status obtaining means 102. A data obtaining method selecting means 104 is for selecting a data obtaining method. A data obtaining method switching means 105 is for performing switching of a data obtaining method when the data obtaining method which is selected by the data obtaining method selecting means 104 is different from a data obtaining method at present. FIG. 2 is a flow chart illustrating a reproducing operation of the server according to the first embodiment.

A description is given of an operation of the video network server according to first embodiment with reference to FIGS. 1 and 2.

In step 207, the network status obtaining means 102 obtains busy status of the network. One example of the busy status of the network is "network traffic information (degree of congestion of the network which is represented by a number of packets or packets lost due to collision through a network)". The network status obtaining means 102 obtains a total number of packets as traffic information. Subsequently in step 208, the network status decision means 103 decides busy status of the network. At this time, as a decision criterion of the busy status of the network, "whether a number of network traffic is larger than a number X or not" is employed. The number X is precomputed, indicating that data can be reproduced in the server when the number of network traffic is not larger than X. In this case, it is decided whether the total number of packets is larger than X or not.

When it is decided that the number of network traffic is larger than the number X" in step 208, the data obtaining method selecting means 104 selects a method wherein all data is copied into the terminal from the network server and the data is reproduced at the terminal using network protocol such as FTP in step 205. The data obtaining method switching means 105 switches a data obtaining method to the method which is selected by the data obtaining method selecting means 104 when the selected data obtaining method is not employed at present, so that data is copied into the terminal using FTP protocol. In step 206, the terminal itself reproduces copied data.

When it is decided that the number of the network traffic is not larger than X, it is assumed that data can be reproduced in the server, so that the data obtaining method selecting means 104 selects a method wherein data which is reproduced in the server is transferred to the terminal using NFS protocol and the data obtaining method switching means 105 switches a data obtaining method to the selected data obtaining method when the selected data obtaining method is not employed at present, and then in step 211 data is reproduced in the video network server.

Thus, in accordance with the video network server of the first embodiment of the present invention, network traffic information is obtained to decide status of the network by the network status obtaining means and the network status decision means, and switching of the data obtaining method is performed between two methods, i.e., the method of reproducing data in the server, and the method of copying data into the terminal and reproducing the data at the terminal according to status of the network, by the data obtaining method selecting means and by the data obtaining method switching means. Therefore, an appropriate data obtaining method can be selected according to status of the system with no need for the user to consciously interrupt and change operation of the system. As a result, data can be reproduced with reliability and qualities of reproduced data are improved.

Figure 3:
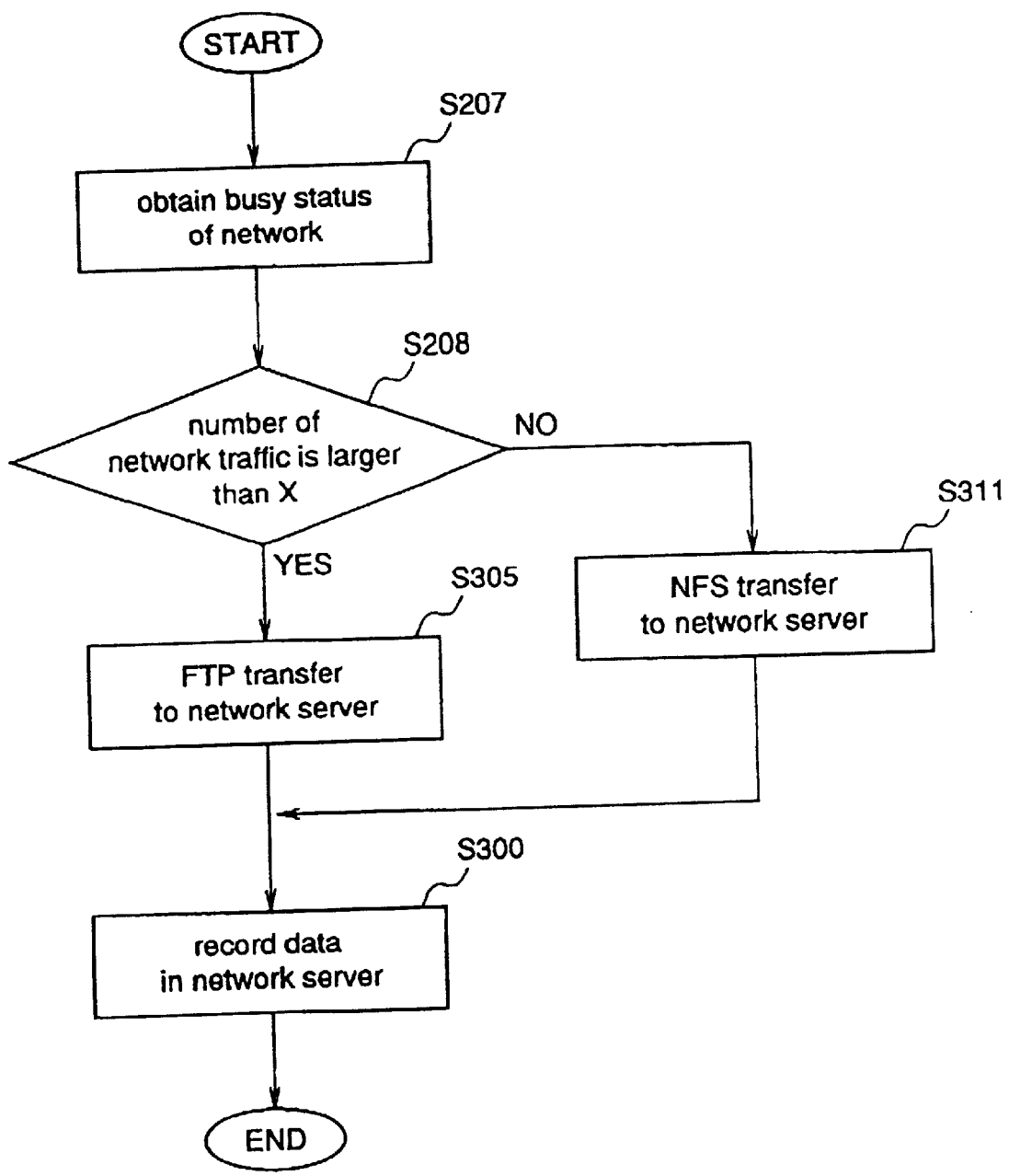
FIG. 3 is a flow chart illustrating a recording operation of the video network server.

Reproduction of a motion picture at the terminal has been described as switching of the data obtaining method at the terminal in description of the operation of the video network server. Alternatively, when data is transferred from terminals and the data is recorded in the storage device of the server, a transfer method is selected according to status following a procedure of a flow chart illustrated in FIG. 3, so that reliability of recording and qualities of recorded data can be improved.

In addition, in the video network server of the first embodiment, the network status obtaining means, the network status decision means, the data obtaining method selecting means, and the data obtaining method switching means are held on the server. Alternatively, these means may be held independently in each terminal, or may be held on another network equipment as a separate apparatus. In this case, the network status obtaining means in the terminal obtains status of the network, the network status decision means makes a decision on the obtained result, the data obtaining method selecting means in the terminal selects a data obtaining method, and the data obtaining method switching means switches a data obtaining method to the selected data obtaining method (in this case FTP protocol or NFS protocol).

Although the method using the FTP protocol and the NFS protocol is illustrated as an example of the data obtaining method, the method is not limited to this and switching can be performed among various data obtaining methods.

Further, as an example of information which is obtained by the network status obtaining means, having illustrated the number of packets or the number of packets lost due to collision through the network, it is not limited to information illustrated in this case, provided that the information indicates status of the network traffic.

Embodiment 2

A video network server according to a second embodiment of the present invention can perform switching of a data transfer method depending on status of the network server.

Figure 4:
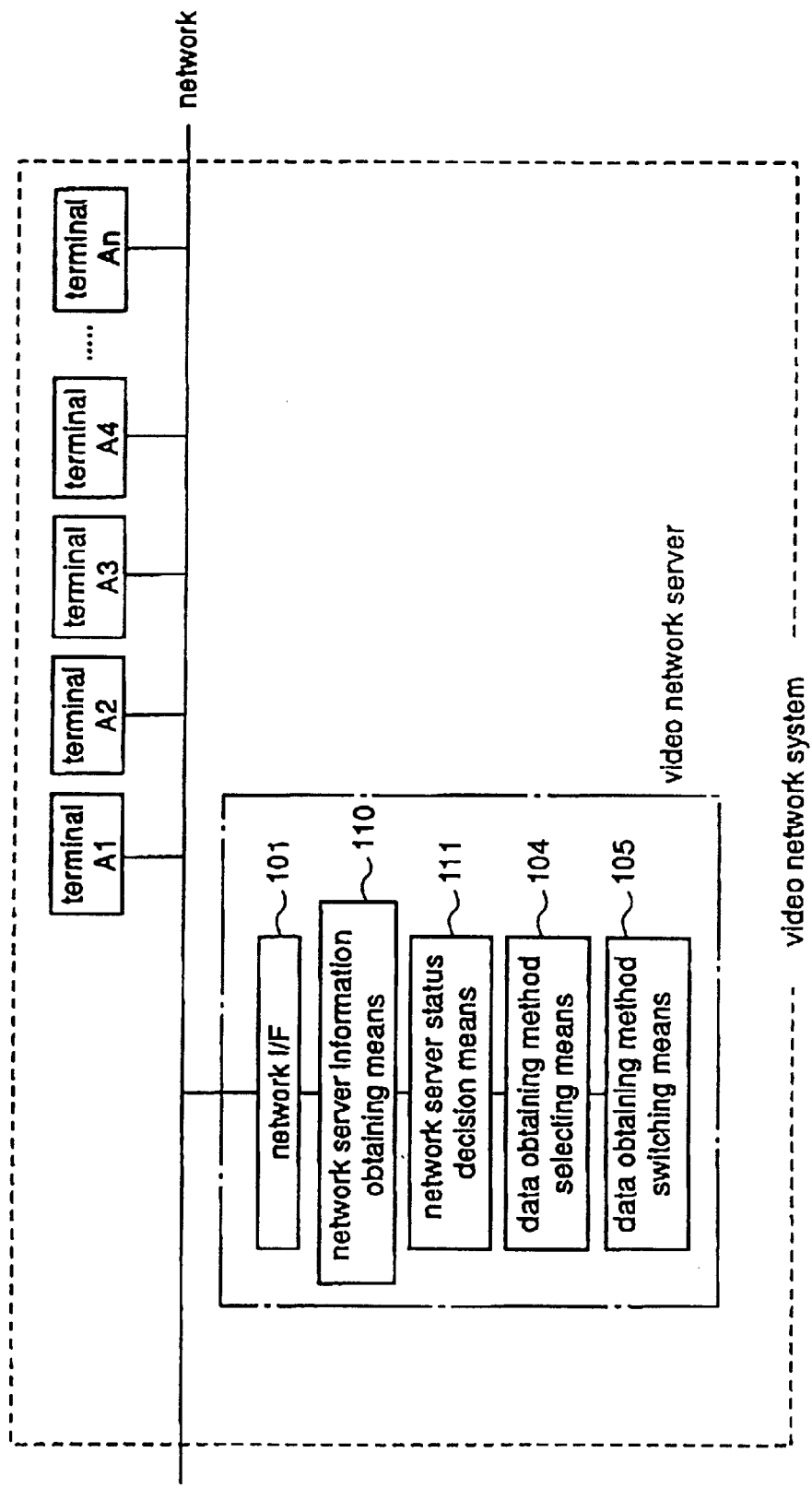
FIG. 4 is a block diagram illustrating a video network server according to a second embodiment of the present invention.
Figure 5:
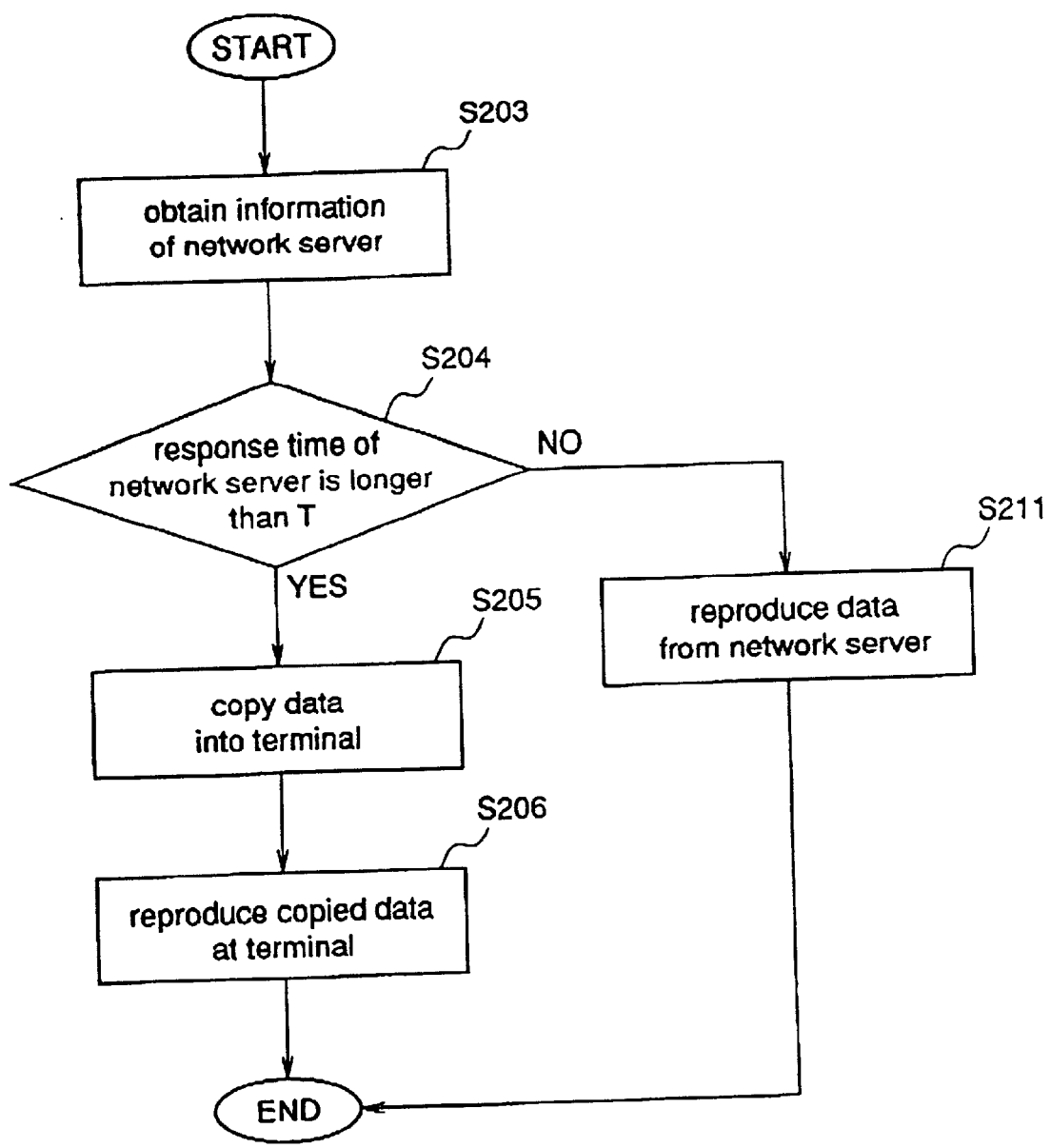
FIG. 5 is a flow chart illustrating a reproducing operation of the video network server.

FIG. 4 is a block diagram illustrating the video network server of the second embodiment. In the figure, a network server information obtaining means 110 is for obtaining information of the network server. A network server status decision means 111 is for deciding status of the network server on the basis of the information which is obtained by the network server information obtaining means 110. The other reference characters are identical to those in the first embodiment and will not be discussed. FIG. 5 is a flow chart illustrating an operation of the server of the second embodiment.

A description is given of an operation of the video network server of the second embodiment with reference to FIGS. 4 and 5.

In step 203, the network server information obtaining means 110 obtains information of the network server. The information of the network server includes, for example, "response time of the network server", which is obtained as information of the server. Subsequently in step 204, the network server status decision means 111 makes a decision on the information of the network server which is obtained in step 203 using "response time of the network server is longer than time T" as a decision criterion. The time T indicates a precomputed number, indicating that data can be reproduced in the server when the response time is not longer than T. In this case, it is decided whether the response time is longer than T or not.

When it is decided that the response time of the network server is longer than the time T, in step 205, the data obtaining method selecting means 104 selects a method wherein all data is copied into the terminal using network protocol such as FTP from the network server and the data obtaining method switching means 105 performs switching of a data obtaining method when the selected data obtaining method is not employed, and then in step 206, copied data is reproduced at the terminal.

When it is decided that the response time of the network server is not longer than the time T in step 204, the data obtaining method selecting means 104 selects a method wherein data which is reproduced in the server is transferred to the terminal using NFS protocol and the data obtaining method switching means 105 performs switching of a data obtaining method when the selected data obtaining method is not employed, and then in step 211, data which is reproduced in the server is transferred from the video network server to the terminal using NFS protocol.

Thus, in accordance with the video network server of the second embodiment of the present invention, status of the network server is decided by the network server information obtaining means and the network server status decision means, and switching of the data obtaining method is performed between two methods, i.e., the method of reproducing data in the server, and the method of copying data into the terminal and reproducing the data at the terminal, according to status of the network server by the data obtaining method selecting means and by the data obtaining method switching means. Therefore, an appropriate data obtaining method can be selected according to status of the system with no need for the user to consciously interrupt and change operation of the system. As a result, data can be reproduced with reliability and qualities of reproduced data are improved.

Figure 6:
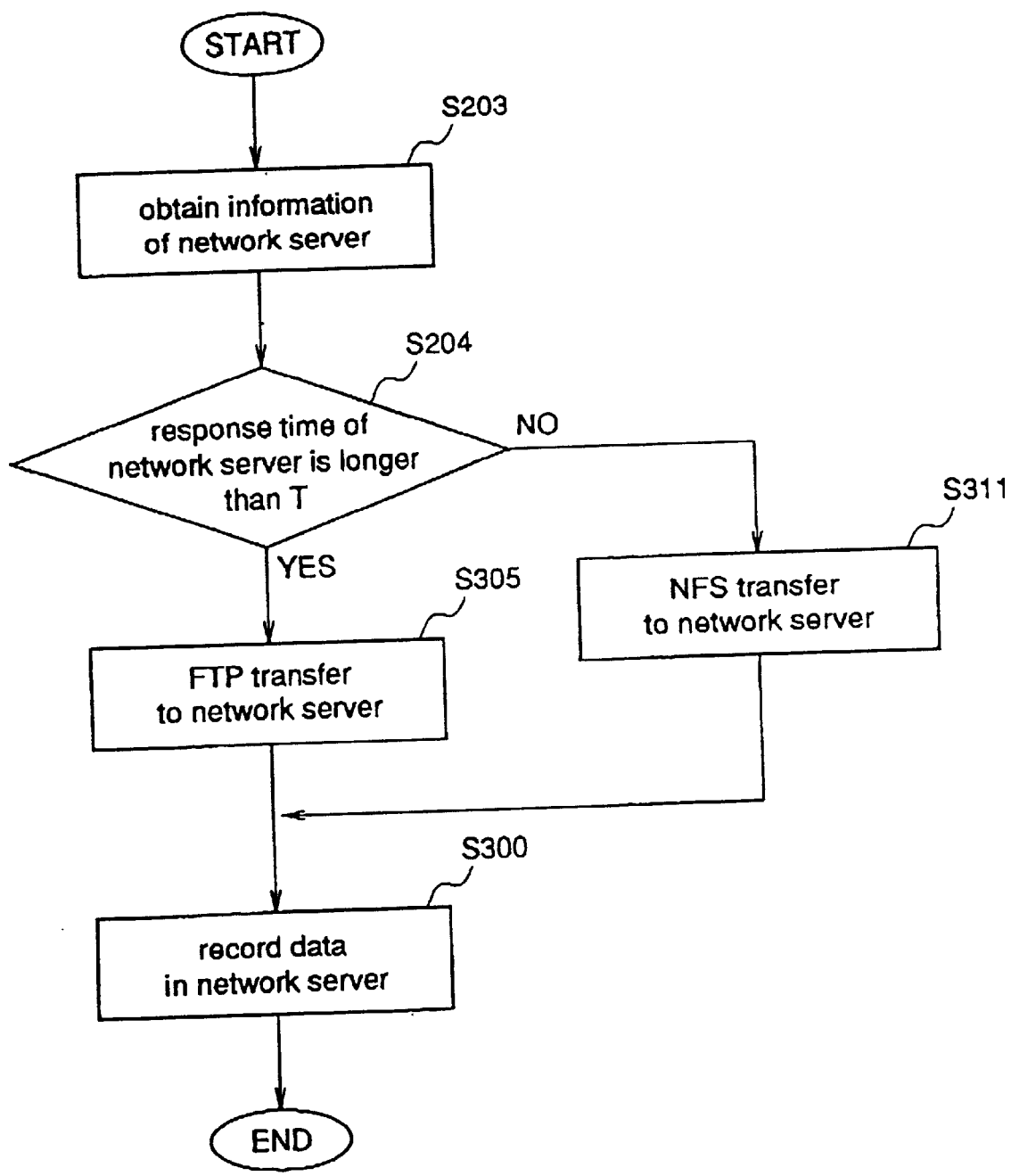
FIG. 6 is a flow chart illustrating a recording operation of the video network server.

In the video network server according to the second embodiment as in the first embodiment, when data is transferred from the terminal and the data is recorded in the storage device of the server, a transfer method can be selected depending on the situation following a procedure of a flow chart illustrate in FIG. 6. As a result, reliability of recording and qualities of recorded data can be improved.

The network server information obtaining means, the network server status decision means, the data obtaining method selecting means, and the data obtaining method switching means may be held independently in each terminal or may be held on another network equipment as a separate apparatus.

Further, the data obtaining method is not limited to FTP protocol and NFS protocol. Information of the network server which is obtained by the network server information obtaining means 110 is not limited to "response time of the network server" and information such as "a number of lost packets/a number of acquired packets" will do, as long as they indicate operating state.

Embodiment 3

A video network server according to a third embodiment of the present invention can perform switching of a data transfer method depending on status of the network server and status of the network.

Figure 7:
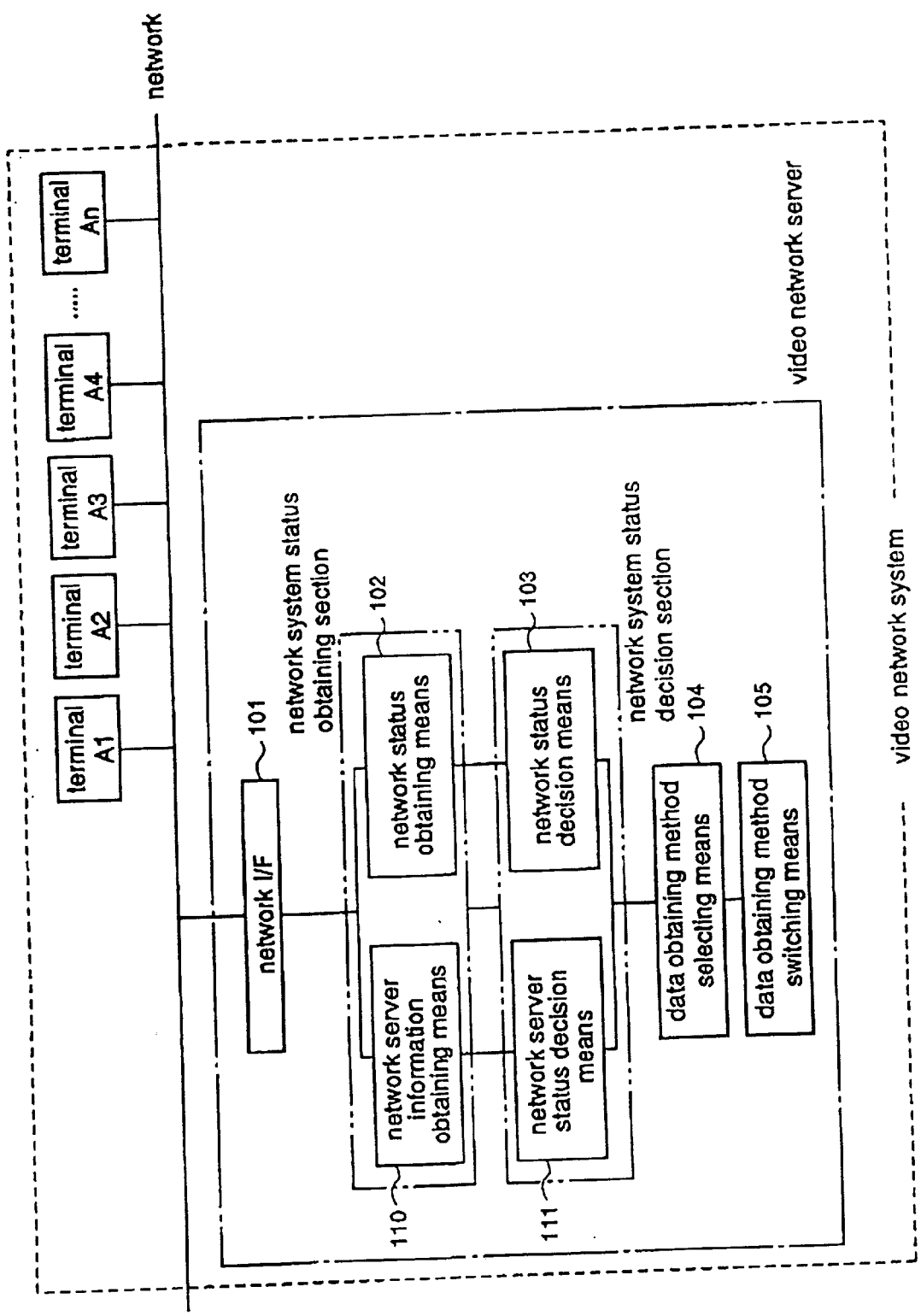
FIG. 7 is a block diagram illustrating a video network server according to a third embodiment of the present invention.
Figure 8:
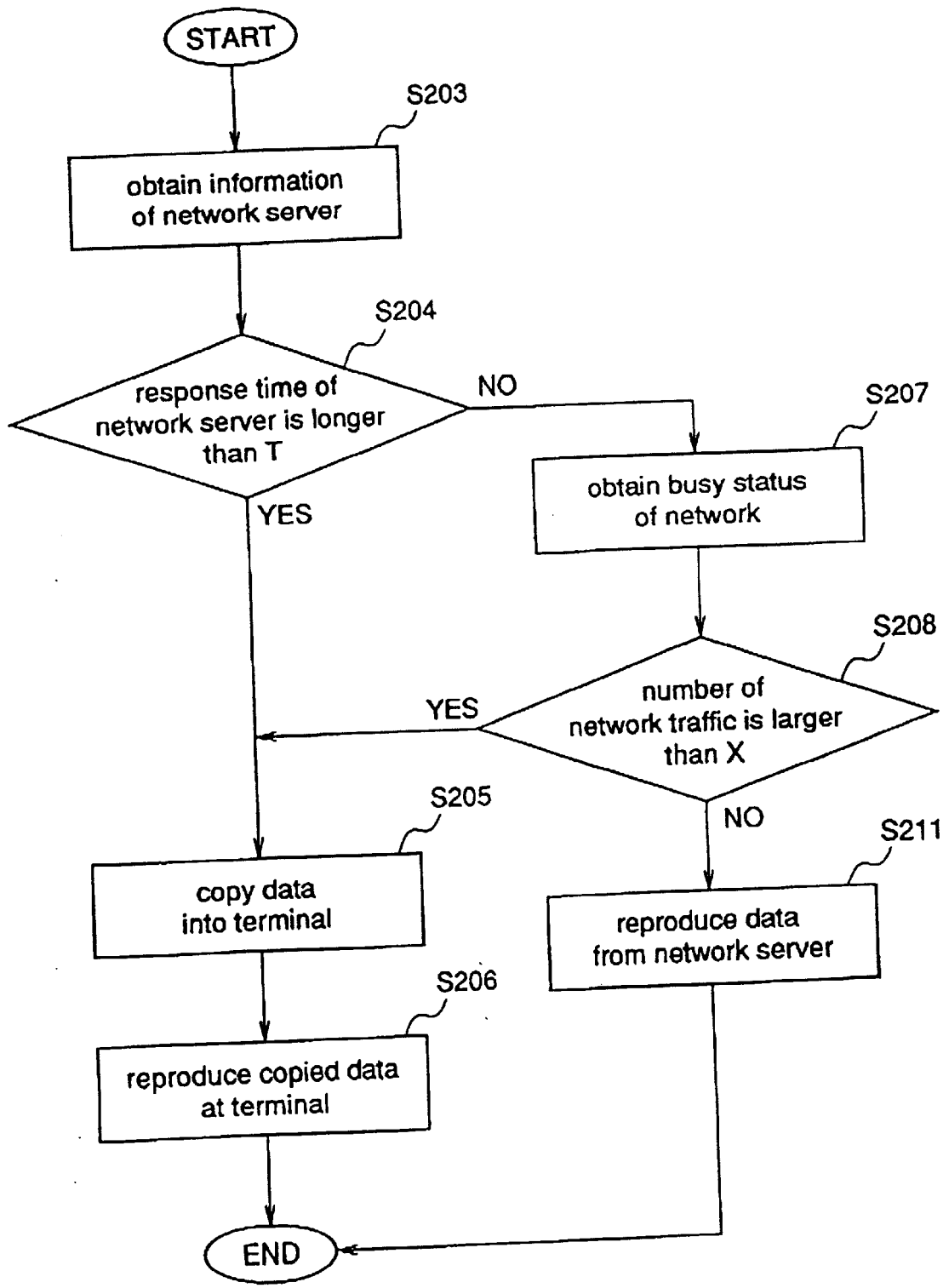
FIG. 8 is a flow chart illustrating a reproducing operation of the video server.

FIG. 7 is a block diagram illustrating a video network server according to a third embodiment of the present invention. In the figure, a network server information obtaining means 110 is for obtaining information of the network server. A network server status decision means 111 is for deciding status of the network server on the basis of the information which is obtained by the network server information obtaining means 110. The other reference characters are identical to those in the first embodiment and will not be discussed. FIG. 8 is a flow chart illustrating an operation of the server according to the third embodiment.

A description is given of an operation of the video network server of the third embodiment with reference to FIGS. 7 and 8.

In step 203, the network server information obtaining means 110 obtains response time of the network server as information of the network server. Subsequently in step 204, the network server status decision means 111 makes a decision on the information of the network server which is obtained in step 203 using "whether response time of the network server is longer than time T or not" as a decision criterion. The time T is identical to that in the second embodiment.

When it is decided that the response time of the network server is longer than the time T, in step 205, the data obtaining method selecting means 104 selects a method wherein all data is copied into the terminal from the network server using network protocol such as FTP and the data obtaining method switching means 105 performs switching of a data obtaining method when the selected data obtaining method is not employed, and then in step 206, copied data is reproduced at the terminal.

When it is decided that the response time of the network server is not longer than the time T in step 204, the network status obtaining means 102 obtains a total number of packets as busy status of the network in step 207. Subsequently in step 208, the network status decision means 103 makes a decision on busy status of the network using "whether a number of network traffic is larger than the number X or not". The number X is identical to that in the first embodiment.

When it is decided that the number of network traffic is larger than the number X in step 208, the data obtaining method selecting means 104 selects a method wherein all data is copied into the terminal from the network server and the data is reproduced at the terminal using network protocol such as FTP in step 205. The data obtaining method switching means 105 switches a data obtaining method to the method which is selected by the data obtaining method selecting means 104 when the selected data obtaining method is not employed, so that data is copied into the terminal using FTP protocol. In step 206, the terminal itself reproduces copied data.

When it is decided that the number of network traffic is not larger than X in step 208, the data obtaining method selecting means 104 selects a method wherein data which is reproduced in the server is transferred to the terminal using NFS protocol and the data obtaining method switching means 105 performs switching of a data obtaining method to the data obtaining method which is selected by the data obtaining method selecting means 104 when the selected data obtaining method is not employed, and then in step 211 data is reproduced in the video network server.

Thus, in accordance with the video network server of the third embodiment, status of the network server is decided by the network server information obtaining means and the network server status decision means, status of the network is decided by the network status obtaining means and the network status decision means, and switching of the data obtaining method is performed between two methods, i.e., the method of reproducing data in the server, and the method of copying data into the terminal and reproducing the data at the terminal, according to status of the network server and status of the network by the data obtaining method selecting means and the data obtaining method switching means. Therefore, an appropriate data obtaining method can be selected according to status of the system with no need for the user to consciously interrupt and change operation of the system. As a result, data can be reproduced with reliability and qualities of reproduced data are improved.

Figure 9:
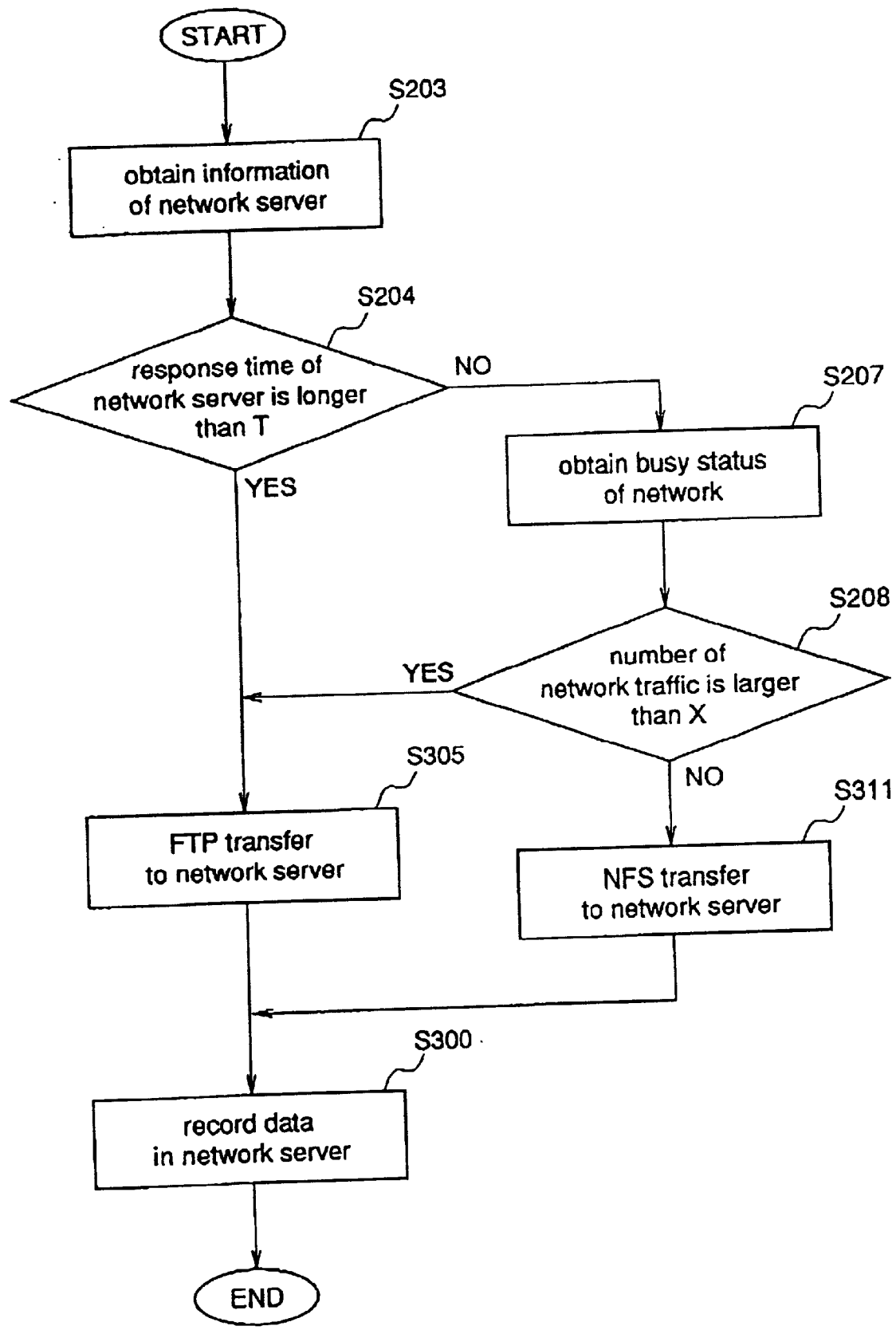
FIG. 9 is a flow chart illustrating a recording operation of the video network server.

In the video network server according to the third embodiment as in the first embodiment, when data is transferred from the terminal and the data is recorded in the storage device of the server, a transfer method can be selected depending on the situation following a procedure of a flow chart illustrated in FIG. 9. As a result, reliability of recording and qualities of recorded data can be improved.

The network status obtaining means, the network status decision means, the network server information obtaining means, the network server status decision means, the data obtaining method selecting means, and the data obtaining method switching means may be held independently in each terminal or may be held on another network equipment as a separate apparatus.

The data obtaining method is not limited to FTP protocol and NFS protocol, information which is obtained by the network status obtaining means is not limited to the total number of packets or the number of packets lost due to collision, and information which is obtained by the network server information obtaining means is not limited to the response time of the server.

In the third embodiment, status of the network server is decided and then status of the network is decided. This may be performed in an arbitrary order.

Embodiment 4

A video network server according to a fourth embodiment of the present invention can change a number of allowable terminals depending on status of the network.

Figure 10:
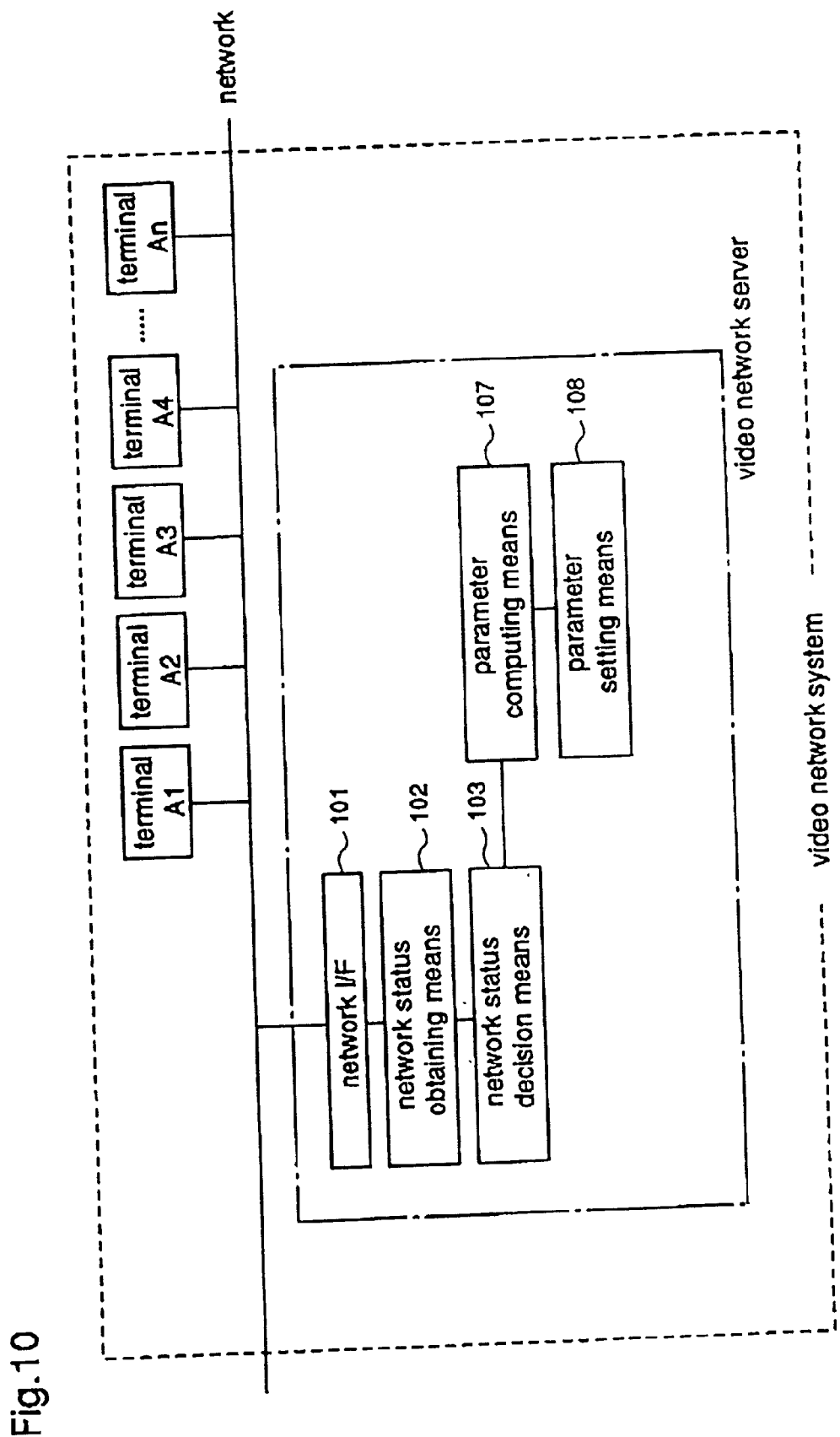
FIG. 10 is a block diagram illustrating a video network server according to a fourth embodiment of the present invention.
Figure 11:
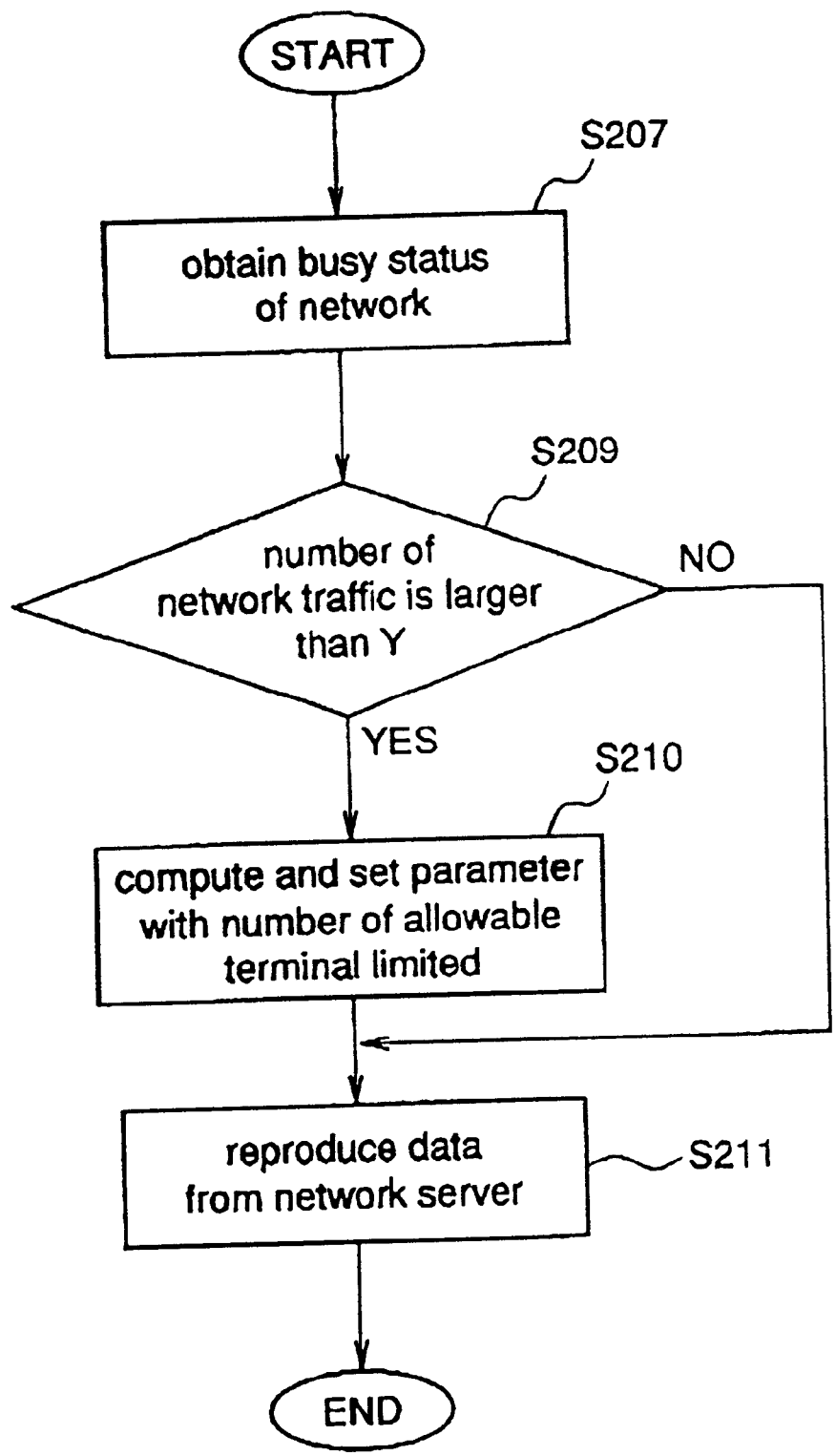
FIG. 11 is a flow chart illustrating a reproducing operation of the video network server.

FIG. 10 is a block diagram illustrating a video network server according to a fourth embodiment of the present invention. In the figure, reference numeral 101 designates a network interface through which the video network server is connected to a network. A network status obtaining means 102 is for obtaining status of the network. A network status decision means 103 is for deciding the status of the network which is obtained by the network status obtaining method 102. A parameter computing means 107 is for computing parameters of the system. A parameter setting means 108 is for setting the parameters which are computed by the parameter computing means 107 in the system. FIG. 11 is a flow chart illustrating an operation of the server of the fourth embodiment.

A description is given of an operation of the video network server of the fourth embodiment with reference FIGS. 10 and 11.

In step 207, the network status obtaining means 102 obtains a total number of packets as busy status of the network. Subsequently in step 209, the network status decision means 103 decides busy status of the network. At this time, "whether a number of network traffic is larger than a number Y or not" is employed as a decision criterion of busy status of the network. The number Y is precomputed, indicating that when the number of network traffic is not larger than Y, data can be reproduced in the server for allowable terminals then. In this case, it is decided whether a total number of packets is larger than the number Y or not.

When it is decided that the number of network traffic is larger than the number Y in step 209, it is assumed that the server is overloaded in present status of the network, so that the parameter computing means 107 limits the number of allowable terminals to a number that is smaller than the number of terminals at present, and when data requests are issued from terminals more than them, the parameter computing means 107 recomputes parameters of the system so that the network server will not receive the data requests, and the parameter setting means 108 sets the parameters which are recomputed by the parameter computing means 107 in the system. In step 211, the video network server transfers data which is reproduced in the server to the terminal using NFS protocol.

When it is decided that the number of network traffic is not larger than the number Y in step 209, in step 211, the video network server transfers the data which is reproduced in the server to the terminal using NFS protocol with parameters of the system unchanged.

Thus, in accordance with the video network server of the fourth embodiment of the present invention, traffic information indicating degree of congestion of the network is obtained to decide status of the network by the network status obtaining means and by the network status decision means, and the number of allowable terminals can be changed according to status of the network by the parameter computing means and by the parameter switching means. Therefore, when status of the network is worse, the number of allowable terminals is limited more severely so as not to increase congestion, thereby troubles such as discontinuity of data are avoided. As a result, motion picture data can be reproduced with reliability and qualities of reproduced data are improved.

Figure 12:
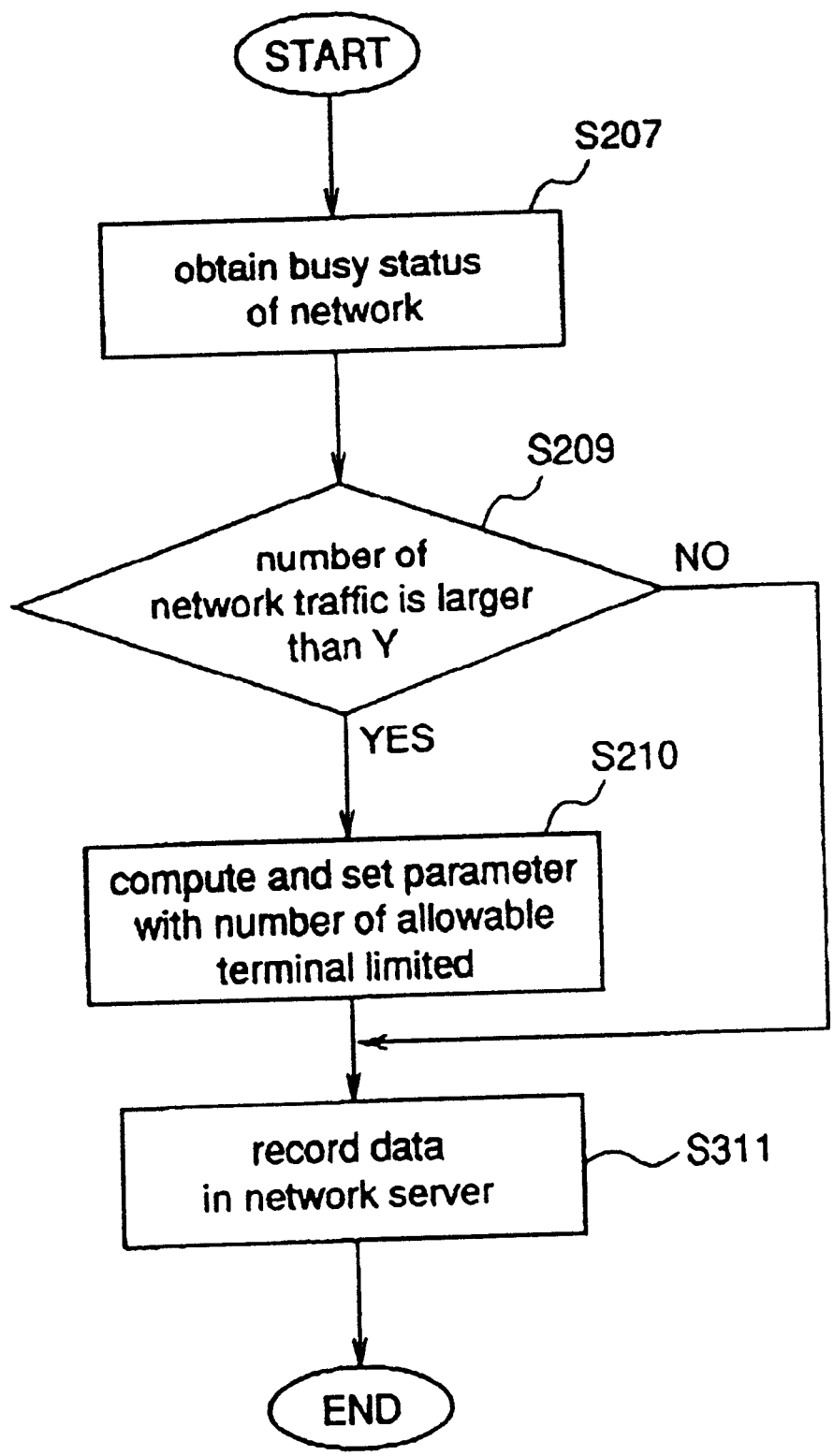
FIG. 12 is a flow chart illustrating a recording operation of the video network server.

Reproduction of motion picture at the terminal has been described as changing of the number of allowable terminals, for explaining the operation of the video network server according to the fourth embodiment. Alternatively, when data is transferred from the terminal and the data is recorded in the storage device of the server, a number of allowable terminals can be set depending on situations, following a procedure of a flow chart illustrated in FIG. 12. As a result, reliability of recording and qualities of recorded data are improved.

The network status obtaining means, the network status decision means, the network server information obtaining means, the network server status decision means, the parameter computing means, and the parameter setting means may be held independently in each terminal, or may be held on another network equipment as a separate apparatus.

Information which is obtained by the network status obtaining means is not limited to the total number of packets.

Embodiment 5

A video network server according to a fifth embodiment of the present invention can change a number of allowable terminals depending on status of the network server.

Figure 13:
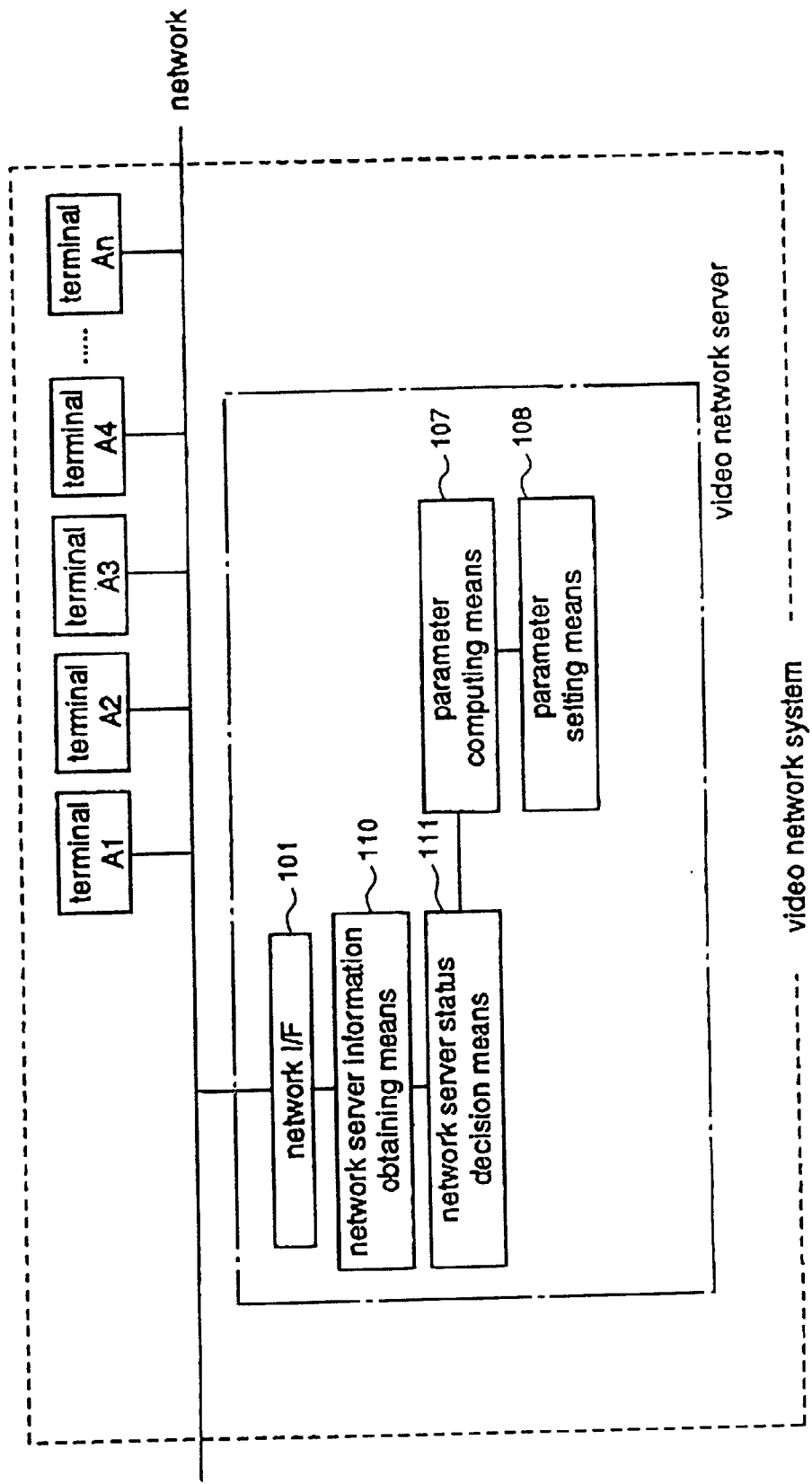
FIG. 13 is a block diagram illustrating a video network server according to a fifth embodiment of the present invention.
Figure 14:
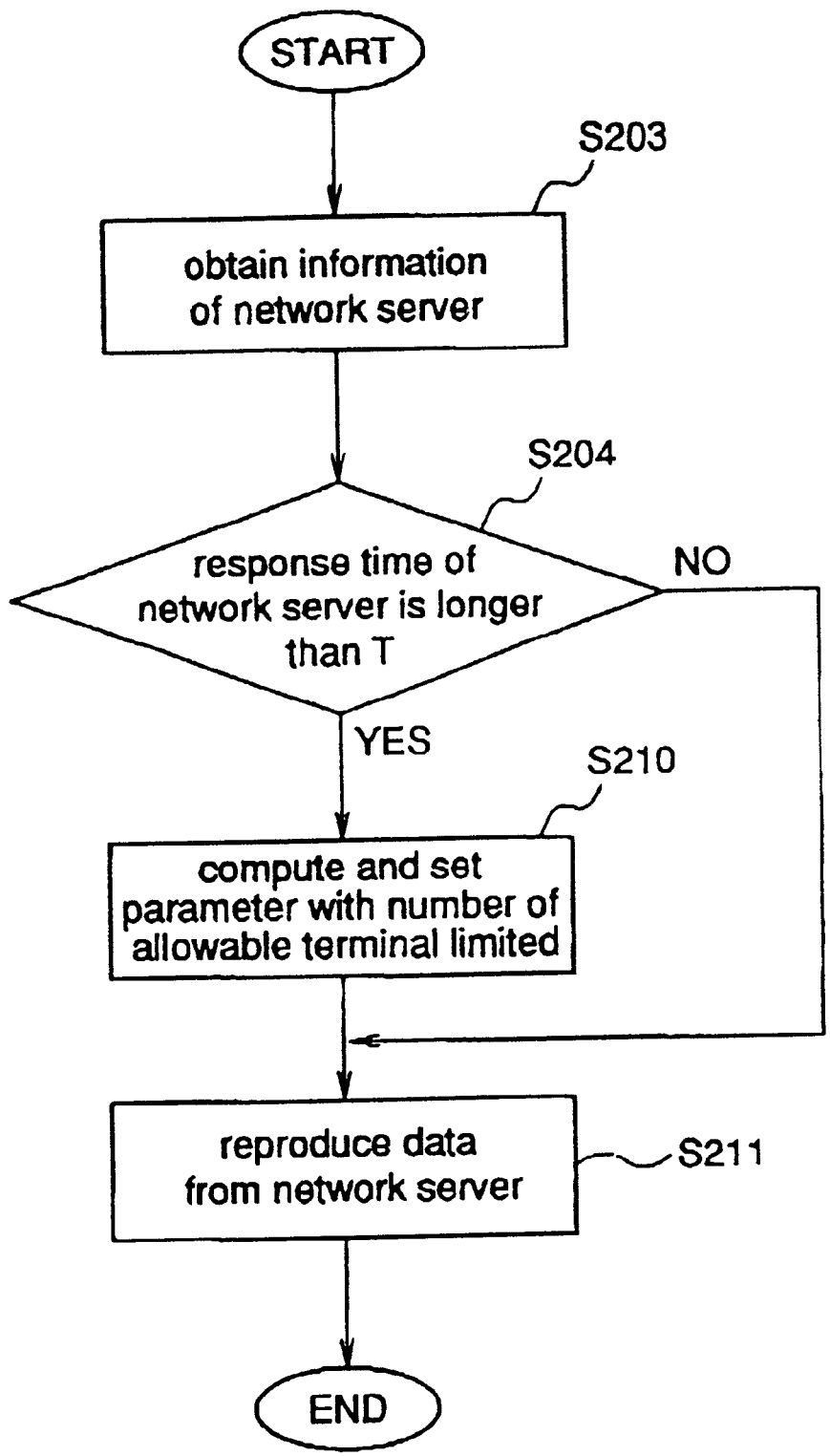
FIG. 14 is a flow chart illustrating a reproducing operation of the video server.

FIG. 13 is a block diagram illustrating a video network server according to a fifth embodiment of the present invention. In the figure, a network server information obtaining means 110 is for obtaining information of the network server. A network server status decision means 111 is for deciding status of the network server on the basis of the information which is obtained by the network server information obtaining means 110. The other reference characters are identical to those in the fourth embodiment and will not be discussed. FIG. 14 is a flow chart illustrating an operation of the server of the fifth embodiment.

A description is given of an operation of the video network server of the fifth embodiment with reference to FIGS. 13 and 14.

In step 203, the network server information obtaining means 110 obtains a response time of the network server as information of the network server. Subsequently in step 204, the network server status decision means 111 makes a decision on the information of the network server which is obtained in step 203 using "whether response time of the network server is longer than time T or not" as a decision criterion. The time T is precomputed, indicating that when the response time is not longer than the time T, data can be reproduced in the serve for allowable terminals then. At this time it is decided whether the response time is longer than T or not.

When it is decided that the response time of the network server is longer than the time T, it is assumed that the server is overloaded, so that the parameter computing means 107 limits the number of allowable terminals to a number that is smaller than the number of terminals at present, and when data requests are issued from terminals more than them, the parameter computing means 107 recomputes parameters of the system so that the network server will not receive the data requests, and the parameter setting means 108 sets theparameters which are recomputed by the parameters computing means 107 in the system. In step 211, the video network server transfers data which is reproduced in the server to the terminal using NFS protocol.

When it is decided that the response time of the network serve is not longer than the time T in step 204, in step 211, the video network server transfers the data which is reproduced in the serve to the terminal using NFS protocol with parameters of the system unchanged.

In the video network server of the fifth embodiment, information such as the response time of the network server is obtained to decide its status by the network server information obtaining means and by the network server status decision means, and a number of allowable terminals can be changed according to status of the network server by the parameter computing means and by the parameters switching means. Therefore, when the network server is overloaded, the number of allowable terminals is limited more severely, thereby a service to the terminal supported at present is not adversely affected by degraded response of the server, and troubles such as discontinuity of data are avoided. As a result, motion picture data can be reproduced with reliability and qualities of reproduced data are improved.

Figure 15:
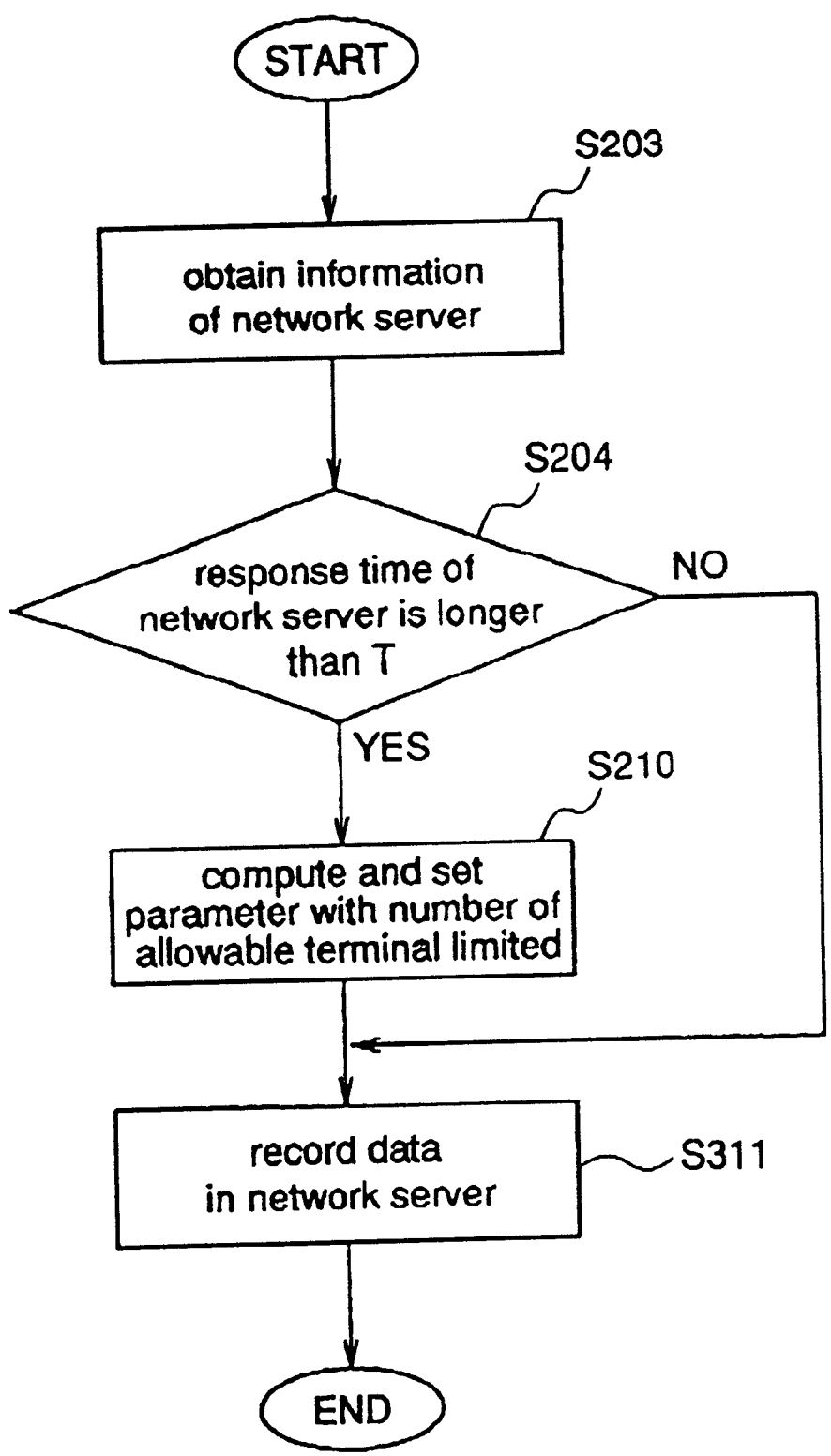
FIG. 15 is a flow chart illustrating a recording operation of the video network server.

In the video network server according to the fifth embodiment as in the fourth embodiment, when data is transferred from the terminal and the data is recorded in a storage device in the server, a number of allowable terminals can be set according to the situation following a procedure of a flow chart illustrated in FIG. 15. As a result, reliability of recording and qualities of recorded data are improved.

The network server information obtaining means, the network server status decision means, the parameter computing means, and the parameter setting means may be held independently in each terminal or may be held on another network equipment as a separate apparatus.

Information which is obtained by the network server information obtaining means is not limited to the response time of the server.

Embodiment 6

A video network server according to a sixth embodiment of the present invention can change a number of allowable terminals depending on status of a network and status of a network server.

Figure 16:
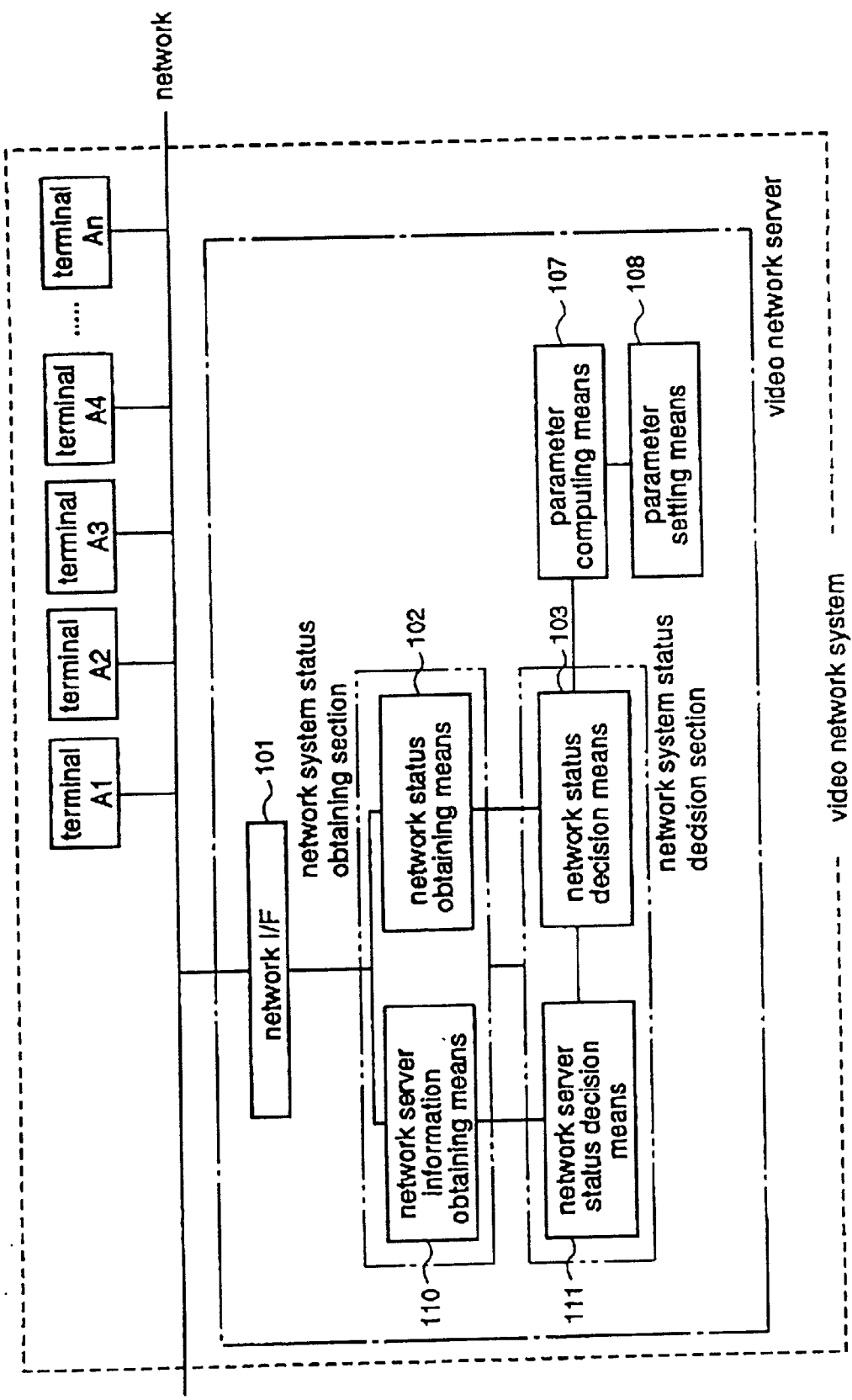
FIG. 16 is a block diagram illustrating a video network server according to a sixth embodiment of the present invention.
Figure 17:
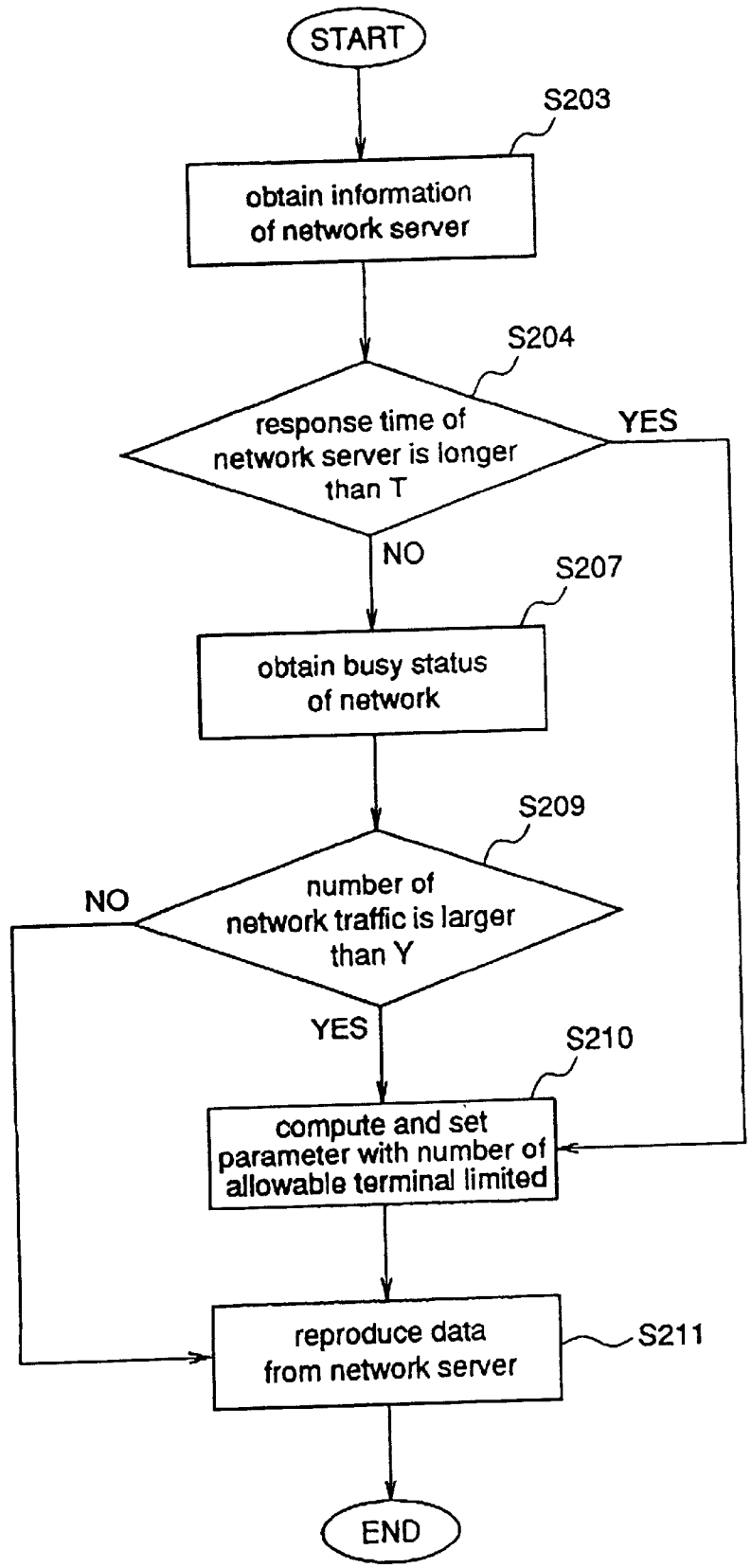
FIG. 17 is a flow chart illustrating a reproducing operation of the video server.

FIG. 16 is a block diagram illustrating a video network server according to the sixth embodiment of the present invention. In the figure, a network server information obtaining means 110 is for obtaining information of the network server. A network serve status decision means 111 is for deciding status of the network server on the basis of the information which is obtained by the network server information obtaining means 110. The other reference characters are identical to those in the fourth embodiment and will not be discussed. FIG. 17 is a flow chart illustrating an operation of the server according to the sixth embodiment.

A description is given of an operation of the video network server according to the sixth embodiment with reference to FIGS. 16 and 17.

In step 203, the network server information obtaining means 110 obtains a response time of the network server as information of the network server. Subsequently in step 204, the network server status decision means 111 makes a decision on the information of the network server which is obtained in step 203 using "whether response time of the network serve is longer than time T or not" as a decision criterion. The time T is identical to that in the fifth embodiment.

When it is decided that the response time of the network serve is longer than the time T, the parameter computing means 107 limits the number of allowable terminals to a number which is smaller than the number of terminals at present, and when data requests are issued from terminals more than them, the parameter computing means 107 recomputes parameters of the system so that the network server will not receive the data requests, and the parameters setting means 108 sets the parameters which are recomputed by the parameter computing means 107 in the system. In step 211, the video network server transfers data which is reproduced in the server to the terminal using NFS protocol.

When it is decided that the response time of the network server is not longer than the time T in step 204, the network status obtaining means 102 obtains network traffic (a total number of packets) as busy status of the network in step 207. Subsequently in step 209, the network status decision means 103 decides busy status of the network using "whether a number of the network traffic is larger than a number Y or not". The number Y is identical to that in the fourth embodiment.

When it is decided that a number of the network traffic is larger than the number Y in step 209, the parameter computing means 107 limits the number of allowable terminals to a number that is smaller than the number of terminals at present, and when data requests are issued from terminals more than them, the parameter computing means 107 recomputes parameters of the system so that the network server will not receive the data requests, and the parameter setting means 108 sets the parameters which are recomputed by the parameter computing means 107 in the system. In step 211, the video network server transfers data which is reproduced in the server to the terminal using NFS protocol.

When it is decided that the number of the network traffic is not larger than the number Y in step 209, it is assumed that the system will be operated in present status of the network, in step 211, the video network server transfers the data which is reproduced in the server to the terminal using NFS protocol with parameters of the system unchanged.

Thus, in accordance with the video network server of the sixth embodiment, status of the network server is decided by the network server information obtaining means and by the network server status decision means, and status of the network is decided by the network status obtaining means and by the network status decision means, a number of allowable terminals can be changed according to status of the network server and status of the network by the parameter computing means and by the parameter setting means. Therefore, when the network server is overloaded or the network is in poor status, a number of allowable terminals is limited more severely, thereby data transfer to the terminals supported at present is not adversely affected by congestion of the network or degraded response of the server. As a result, motion picture data can be reproduced with reliability and qualities of reproduced data are improved.

Figure 18:
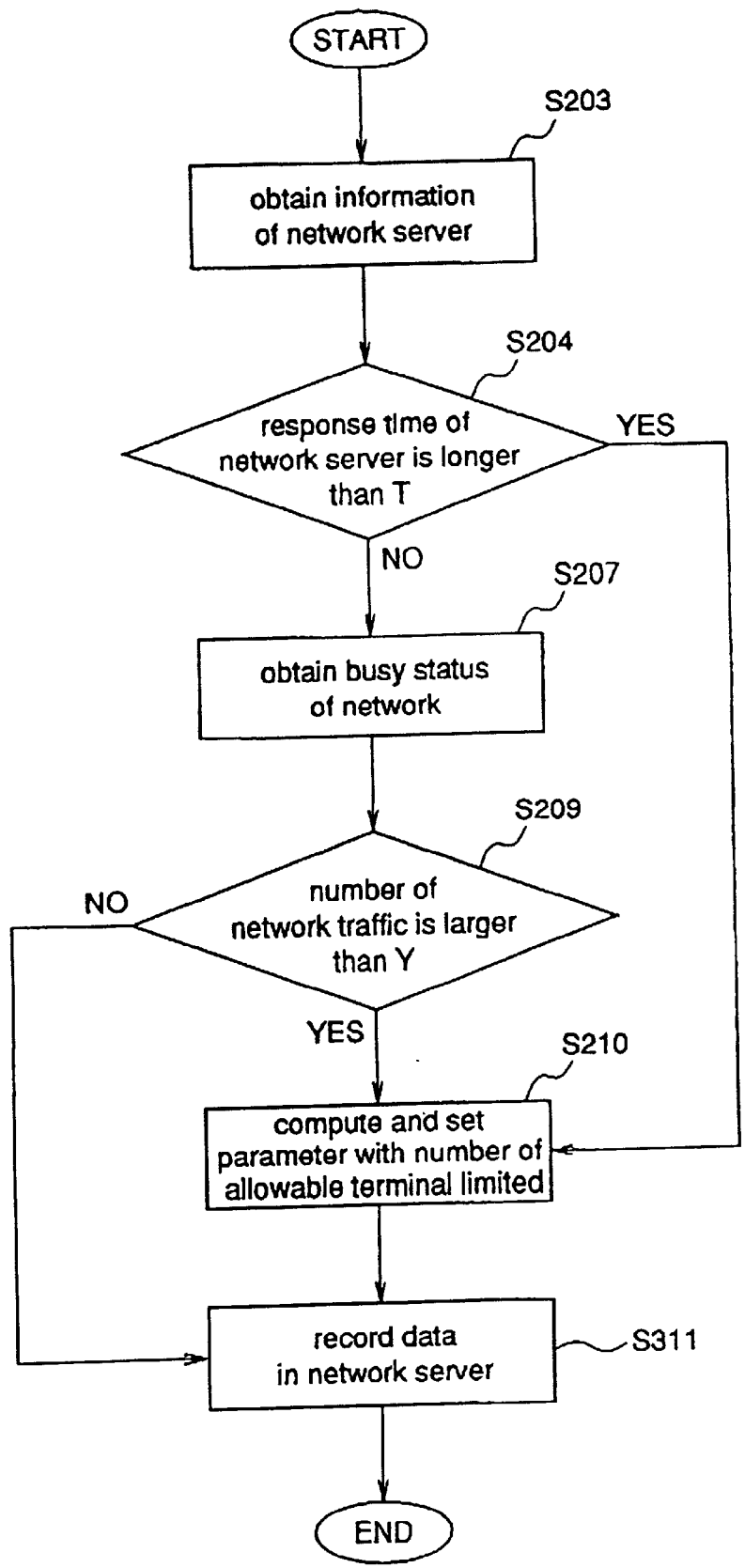
FIG. 18 is a flow chart illustrating a recording operation of the video network server.

In the video network server according to the sixth embodiment as in the fourth embodiment, when data is transferred from the terminal and the data is recorded in a storage device of the server, a number of allowable terminals can be set depending on the situation following a procedure of a flow chart illustrated in FIG. 18. As a result, reliability of recording and qualities of recorded data are improved.

The network status obtaining means, the network status decision means, the network server information obtaining means, the network server status decision means, the parameter computing means, and the parameter setting means may be held in each terminal independently, or may be held on another network equipment as a separate apparatus.

Information which is obtained by the network status obtaining means is not limited to the total number of packets, and information which is obtained by the network server information obtaining means is not limited to the response time of the server.

In the sixth embodiment, status of the network server is decided, and then status of the network is decided. Alternatively, this order may be reversed.

Embodiment 7

A video network server according to a seventh embodiment of the present invention can change a number of allowable terminals depending on an allowable range of a quality of reproduced data specified by the user and status of the network.

Figure 19:
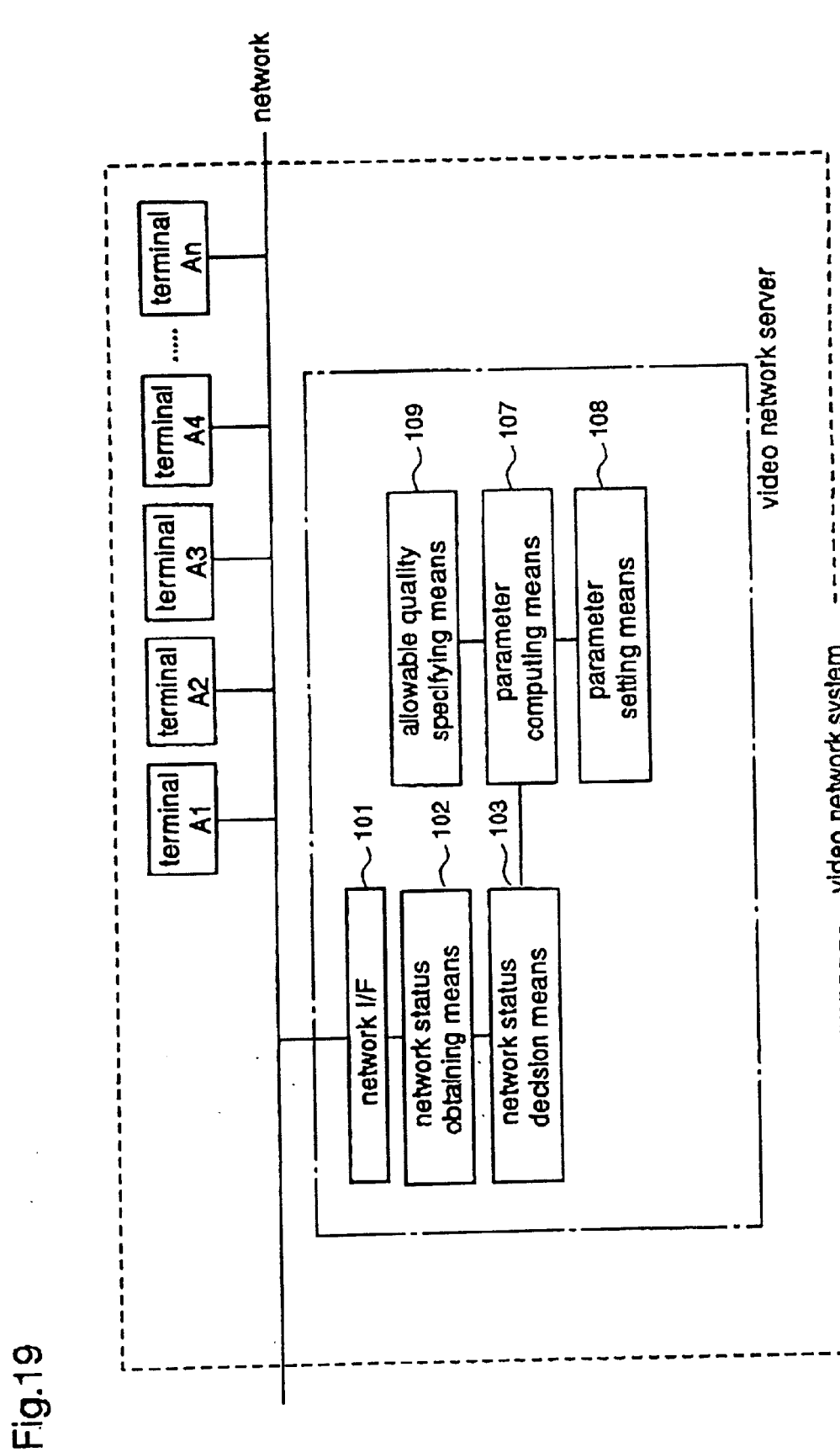
FIG. 19 is a flow chart illustrating an operation of a video network server according to a seventh embodiment of the present invention.
Figure 20:
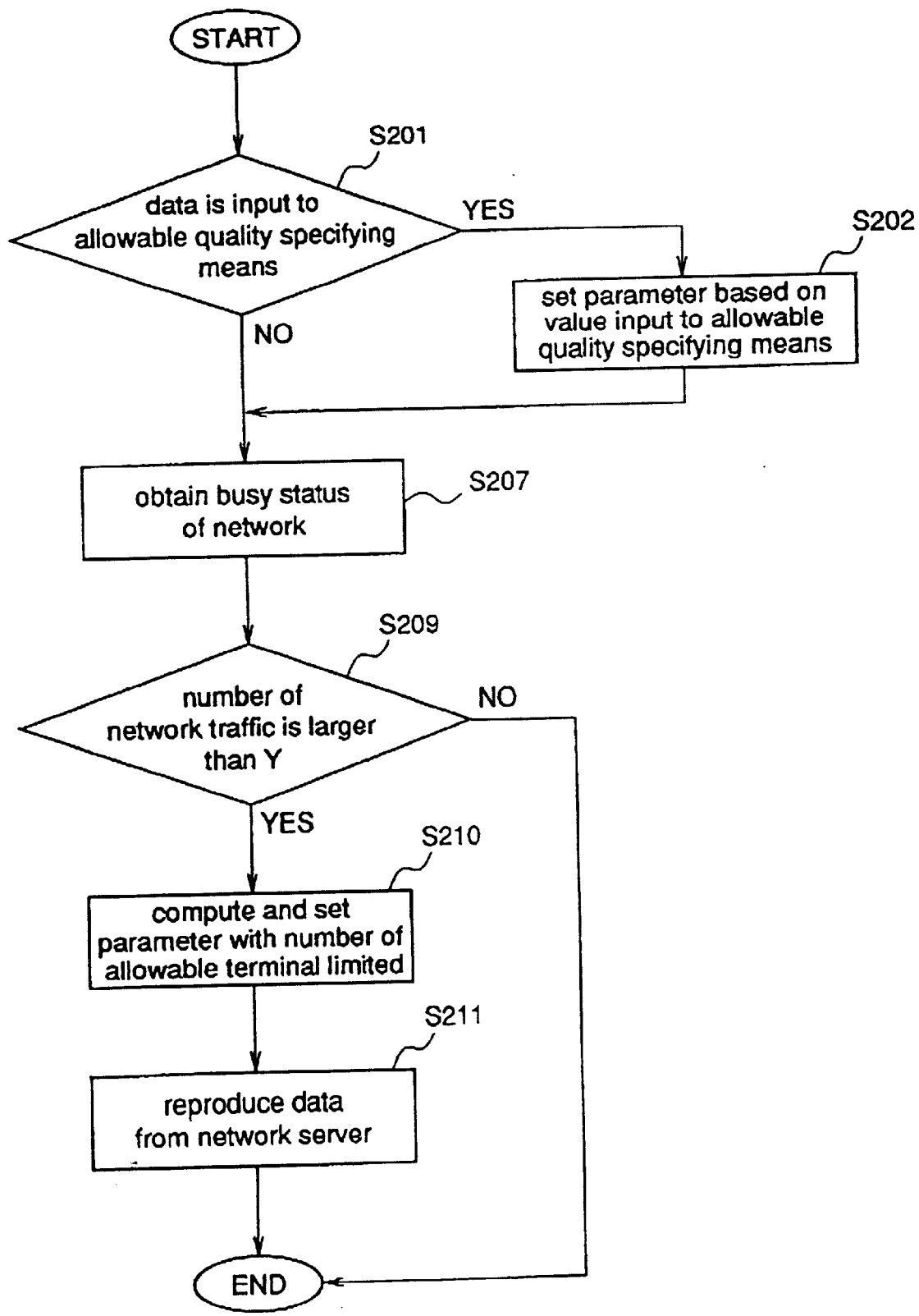
FIG. 20 is a flow chart illustrating a reproducing operation of the video network server.

FIG. 19 is a block diagram illustrating a video network server according to the seventh embodiment of the present invention. In the figure, reference numeral 109 designates an allowable quality specifying means to which the user inputs an allowable range of a quality of reproduced data. The other reference characters are identical to those in the fourth embodiment and will not be discussed. FIG. 20 is a flow chart illustrating an operation of the server of the seventh embodiment.

A description is given of an operation of the video network server of the seventh embodiment with reference to FIGS. 19 and 20.

In step 201, it is decided whether information of the allowable range of the quality of reproduced data is input to the allowable range specifying means 109 by the user or not. This allowable range includes, for example, "discontinuity of sound of data occurs N times or less an hour", "interval of data discontinuity in minutes" or "interval of data discontinuity in minutes for several seconds." When this information is input, in step 202, the parameter computing means 107 computes parameters on the basis of the input information and the parameter setting means 108 sets the computed parameters in the system. Generally, using a larger allowable range, for example, the more frequently discontinuity of sound of data occurs, the more terminals the system can support or the higher a transfer rate of reproducible data is. Using a smaller allowable range, it is reversed. In step 201, when the allowable quality is not specified by the user, the process moves to a next step.

Steps subsequent to step 207 are identical to those in the fourth embodiment.

Thus, in accordance with the video network server according to the seventh embodiment, specification by the user of the allowable range of the quality of reproduced data is accepted by the allowable quality specifying means, status of the network is decided by the network status obtaining means and by the network status decision means using traffic information indicating a degree of congestion of the network, and the number of allowable terminals can be changed by the parameter computing means and by the parameter switching means depending on the allowable range by the allowable quality specifying means and status of the network. Therefore, the system can be constructed with flexibility in accordance with demands from the user as follows: terminals which the system may allow are increased previously with a quality of data degraded in some degree, or the quality of data is further improved with a number of terminals limited. In addition, when the network is in poor status, that is, the network server is overloaded, the number of allowable terminals is limited more severely, thereby data transfer to the terminals supported at present is not adversely affected by congestion of the network or degraded response of the server. As a result, motion picture data can be reproduced with reliability and qualities of reproduced data are improved.

Figure 21:
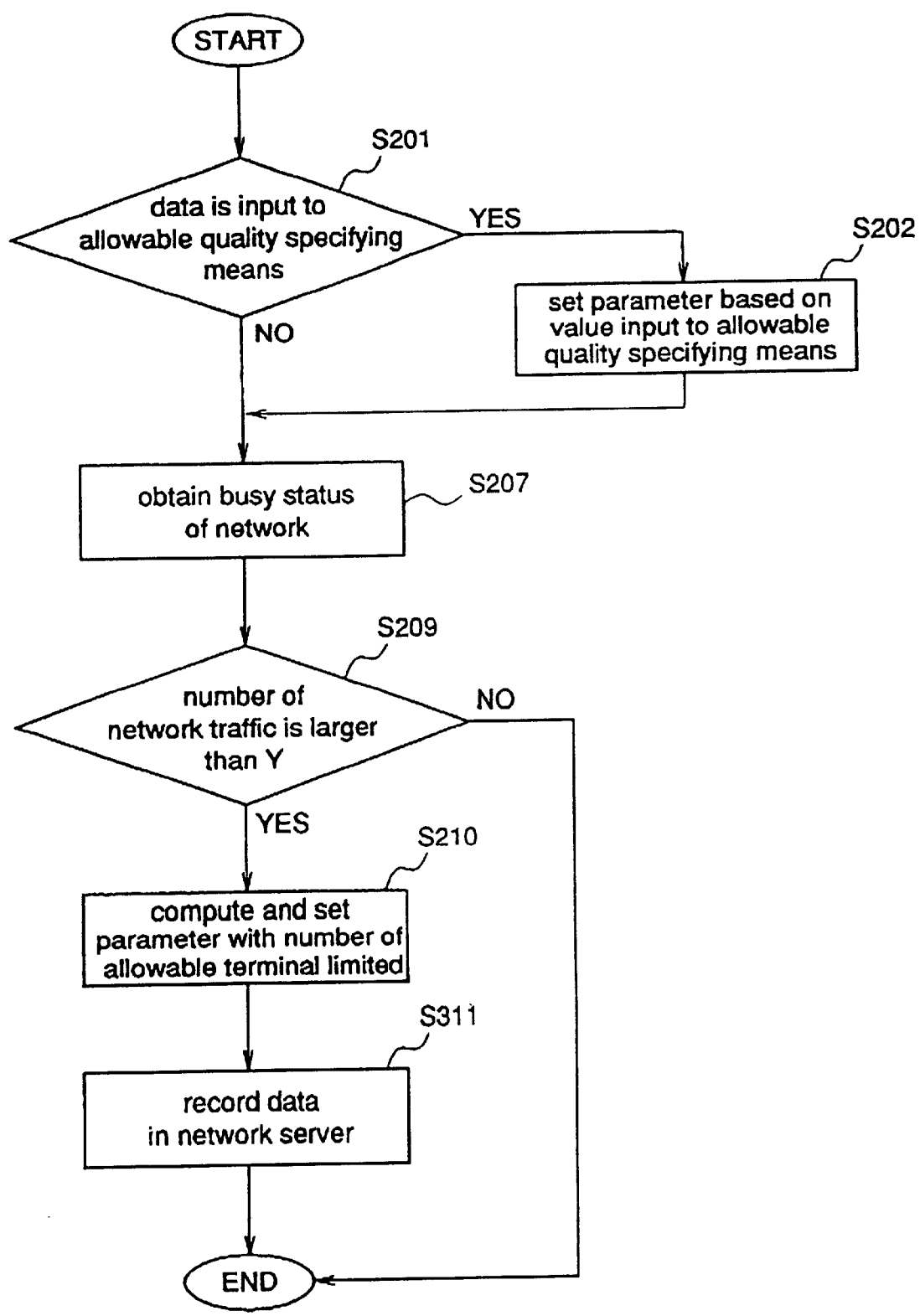
FIG. 21 is a flow chart illustrating a recording operation of the video network server.

In the video network server according to the seventh embodiment as in the fourth embodiment, when data is transferred from the terminal and the data is recorded in a storage device of the server, a number of allowable terminals can be set depending on the situation following a procedure of a flow chart illustrated in FIG. 21. As a result, reliability of recording and qualities of recorded data are improved.

The allowable quality specifying means, the network status obtaining means, the network status decision means, the network server information obtaining means, the network server status decision means, the parameter computing means, and the parameter setting means may be held independently in each terminal, or may be held on another network equipment as a separate apparatus.

Information which is obtained by the network status obtaining means is not limited to the total number of packets and information which is input to the allowable quality specifying means is not limited to this illustration.

Embodiment 8

A video network server according to an eighth embodiment of the present invention can change a number of allowable terminals depending on an allowable range of qualities of reproduced data specified by the user and status of the network server.

Figure 22:
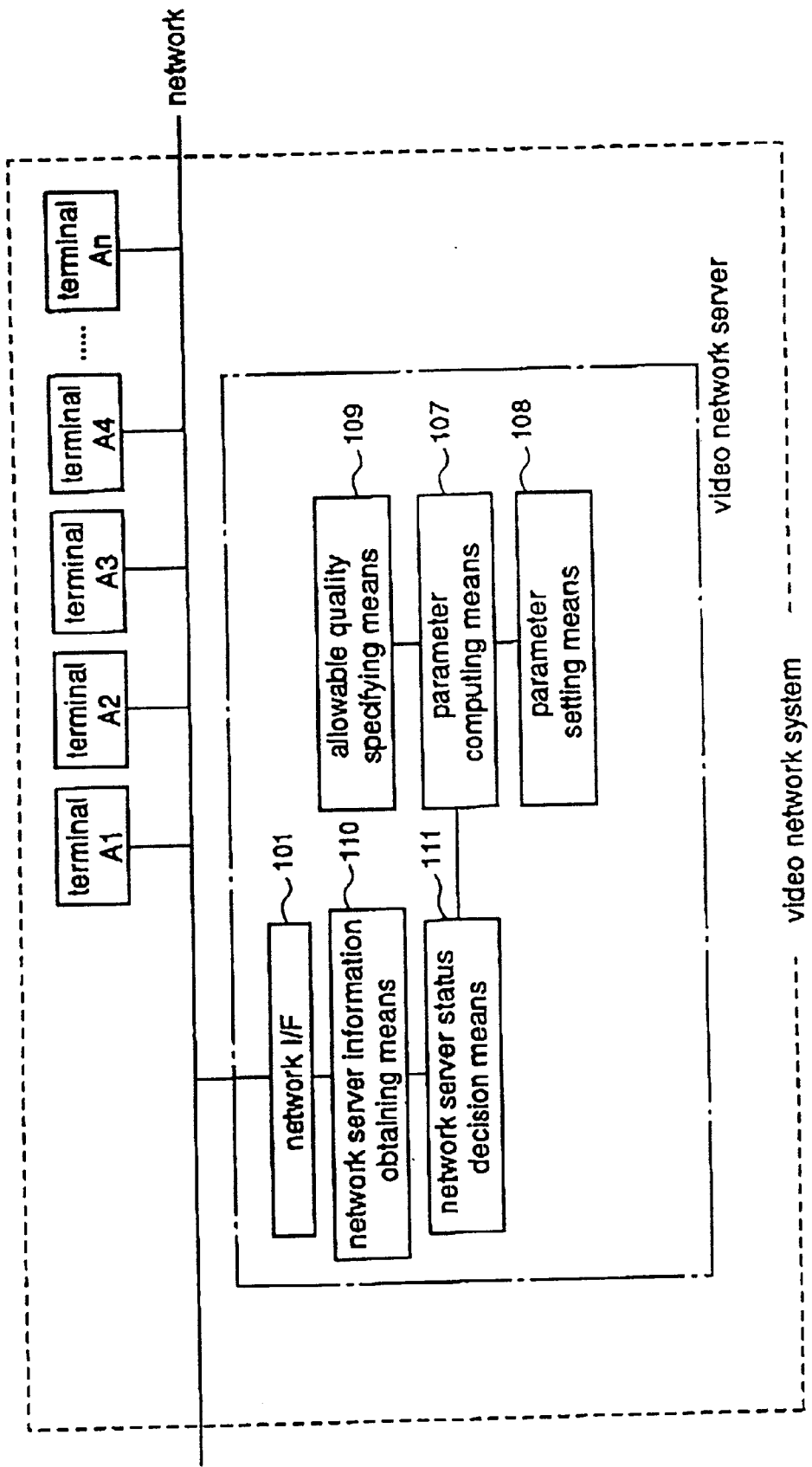
FIG. 22 is a block diagram illustrating a video network server according to an eighth embodiment of the present invention.
Figure 23:
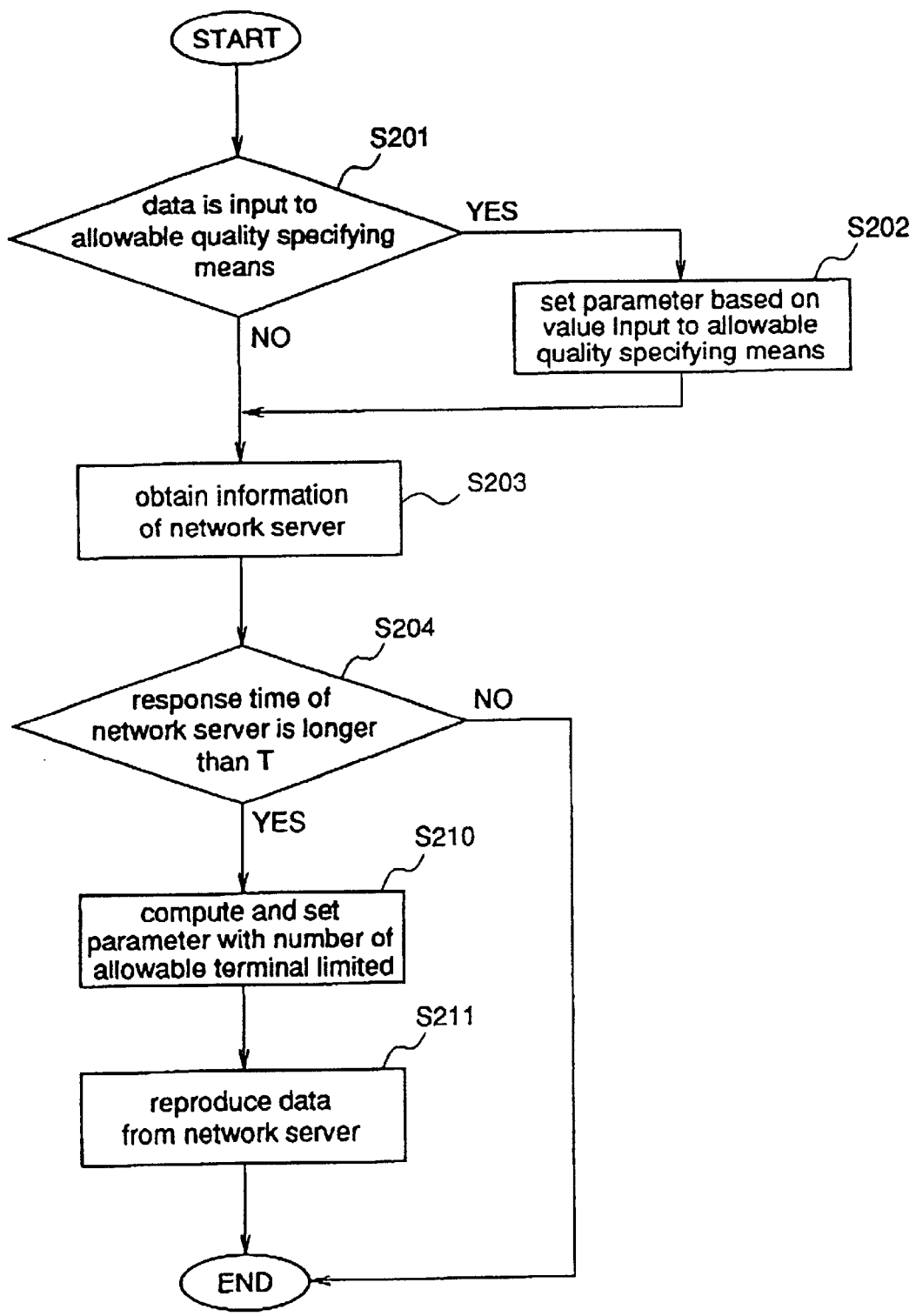
FIG. 23 is a flow chart illustrating a reproducing operation of the video network server.

FIG. 22 is a block diagram illustrating a video network server according to the eighth embodiment of the present invention. In the figure, reference numeral 109 designates an allowable quality specifying means to which the user inputs an allowable range of a quality of reproduced data. The other reference characters are identical to those in the fifth embodiment and will not be discussed. FIG. 23 is a flow chart illustrating an operation of the server of the eighth embodiment.

A description is given of an operation of a video network server of the eight embodiment with reference to FIGS. 22 and 23.

In step 201, it is decided whether information of the allowable range of the quality of reproduced data is input to the allowable quality specifying means 109 by the user or not. The allowable range is identical to that in the seventh embodiment.

When it is decided that information is input to the allowable quality specifying means 109, in step 202, the parameter computing means 107 computes parameters on the basis of the input information and the parameter setting means 108 sets the computed parameters in the system. In step 201, when it is decided that the allowable ranges is not specified by the user, the process moves to a next step.

Step subsequent to step 203 are identical to those in the fifth embodiment.

Thus, in the video network server according to the eighth embodiment, specification by the user of the allowable range of the quality of reproduced data is accepted by the allowable quality specifying means, information such as the response time of the network server is obtained to decide its status by the network server information obtaining means and by the network server status decision means, a number of allowable terminals can be changed by the parameter computing means and by the parameter switching means depending on the allowable range by the allowable quality specifying means and status of the network server. Therefore, the system can be constructed with flexibility in accordance with demands from the user with respect to the quality of data and the number of allowable terminals. In addition, when the network server is overloaded, the number of allowable terminals is limited more severely to reduce load of the server, so that a service to terminals supported at present is not adversely affected by the load of the network server. As a result, motion picture data can be reproduced with reliability and qualities of reproduced data are improved.

Figure 24:
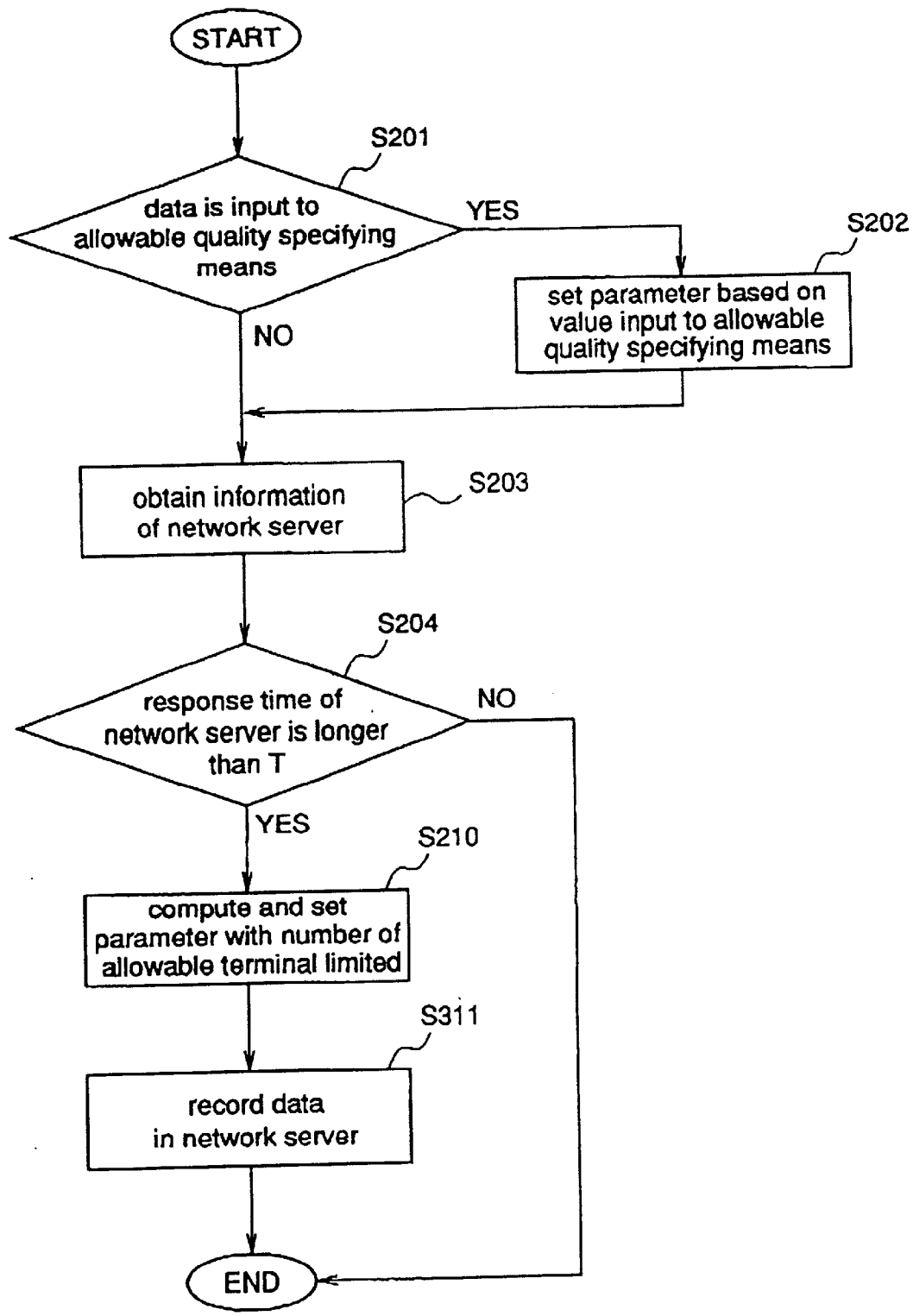
FIG. 24 is a flow chart illustrating a recording operation of the video network server.

In the video network server according to the eighth embodiment as in the fourth embodiment, when data is transferred from the terminal and the data is recorded in a storage device of the server, the number of allowable terminals can be set depending on the situation following a procedure of a flow chart illustrated in FIG. 24. As a result, reliability of recording and qualities of recorded data are improved.

The allowable quality specifying means, the network server information obtaining means, the network server status decision means, the parameter computing means, and the parameter setting means may be held independently in each terminal, or may be held on another network equipment as a separate apparatus.

Information which is obtained by the network server information obtaining means is not limited to the response time and information which is input to the allowable quality specifying means is not limited to this illustration, either.

Embodiment 9

A video network server according to a ninth embodiment of the present invention, a number of allowable terminals can be changed depending on an allowable range of a quality of reproduced data specified by the user, status of the network server, and status of the network.

Figure 25:
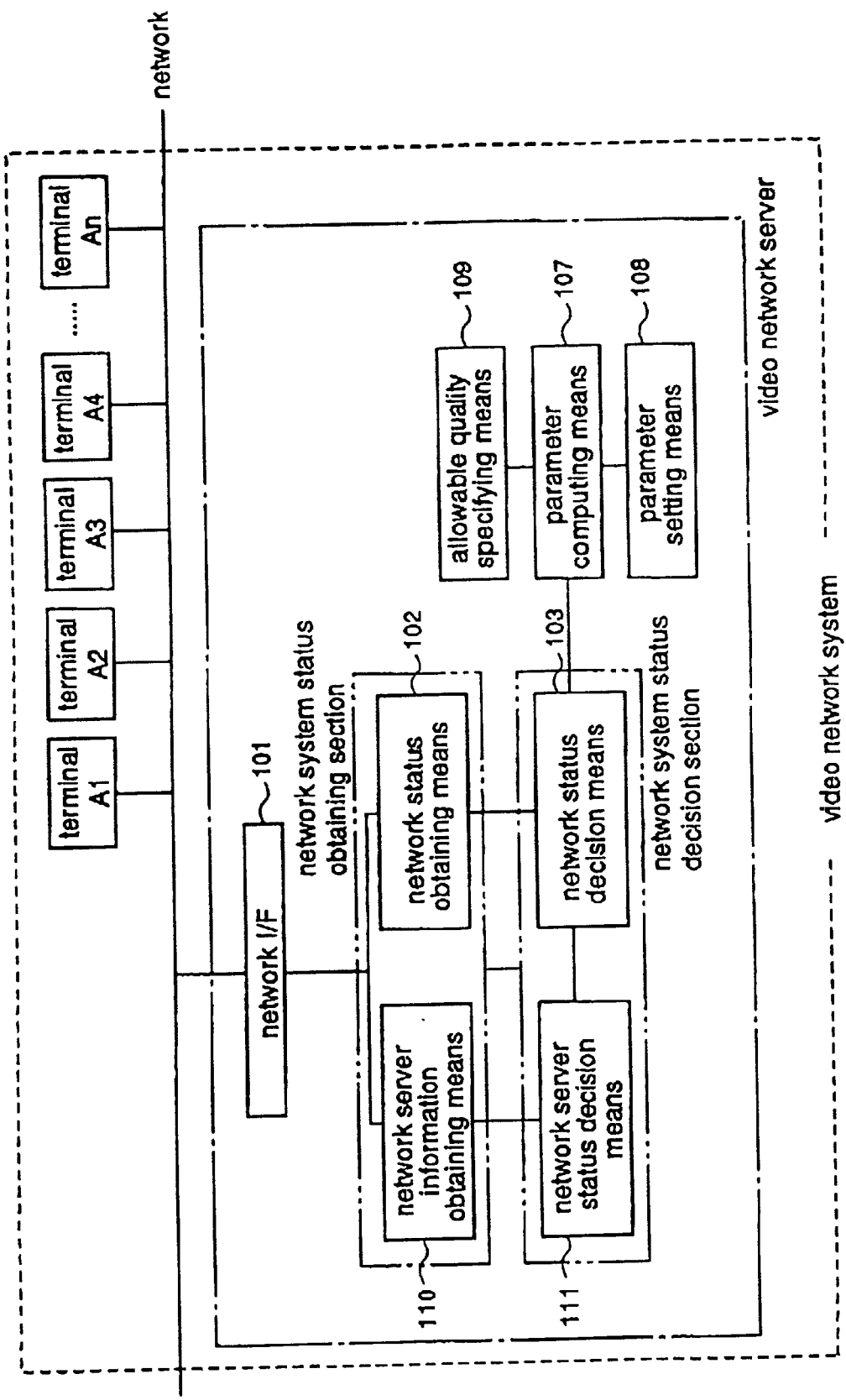
FIG. 25 is a block diagram illustrating a video network server according to a ninth embodiment of the present invention.
Figure 26:
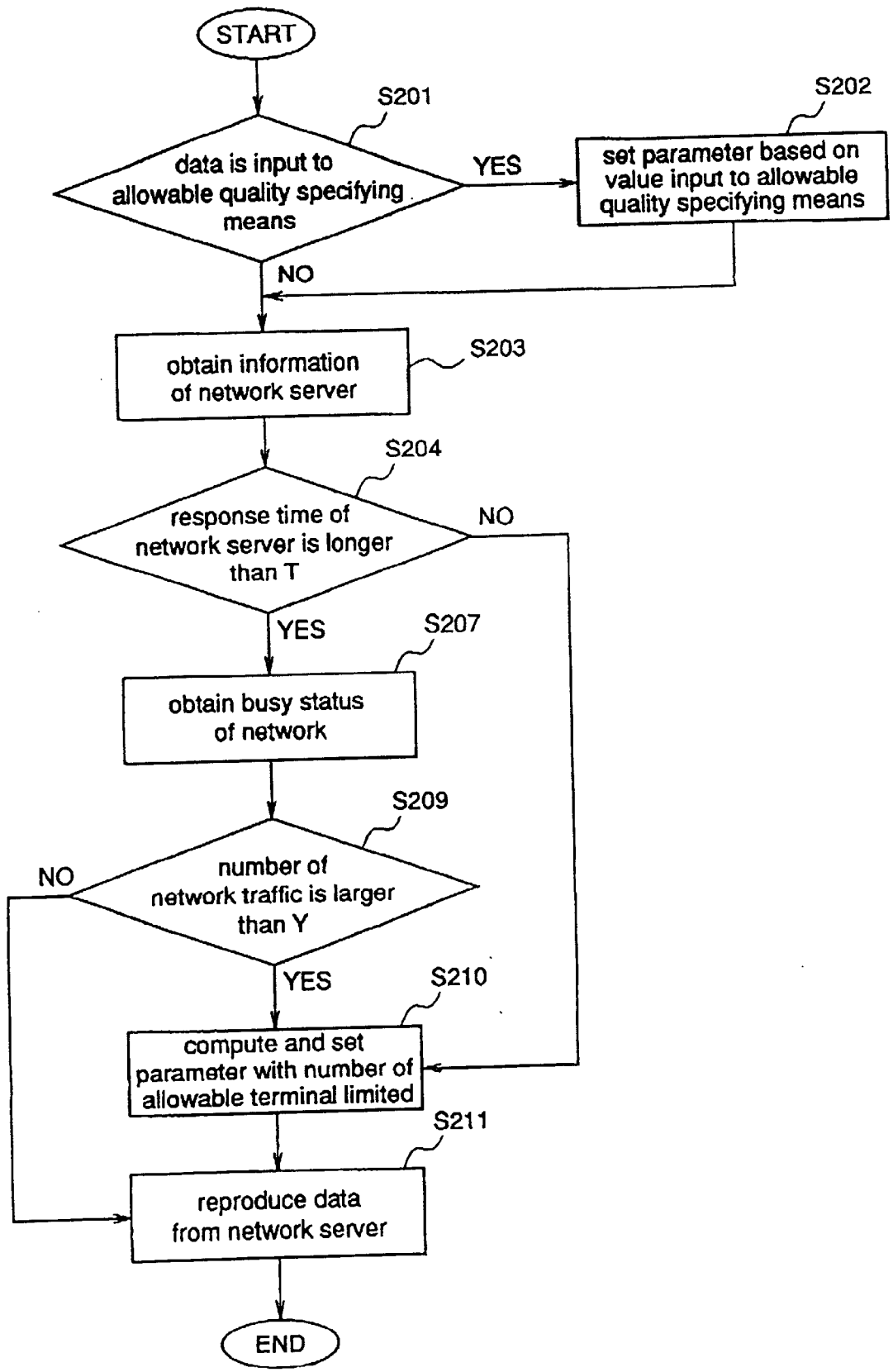
FIG. 26 is a flow chart illustrating a reproducing operation of the video network server.

FIG. 25 is a block diagram illustrating the video network server according to the ninth embodiment of the present invention. In the figure, reference numeral 109 designates an allowable quality specifying means to which the user inputs an allowable range of a quality of reproduced data. The other reference characters are identical to those in the sixth embodiment and will not be discussed. FIG. 26 is a flow chart illustrating an operation of the server of the ninth embodiment.

A description is given of an operation of a video network server according to the ninth embodiment with reference to FIGS. 25 and 26.

In step 201, it is decided whether information of the allowable range of the quality of reproduced data is input to the allowable quality specifying means 109 by the user or not. The allowable range is identical to that in the seventh embodiment.

When it is decided that information is input to the allowable quality specifying means 109, in step 202 parameters are computed by the parameter computing means 107 on the basis of input information and the computed parameters are set in the system by the parameter setting means 108. In step 201, when an allowable range is not specified by the user, the process moves to a next step.

Steps subsequent to step 203 are identical to those in the sixth embodiment.

Thus, in the video network server according to the ninth embodiment, specification by the user of the allowable range of the quality of reproduced data is accepted by the allowable quality specifying means, status of the network server is decided by the network server information obtaining means and by the network server status decision means, status of the network is decided by the network status obtaining means and by the network status decision means, the number of allowable terminals can be changed by parameter computing means and by the parameter setting means depending on the allowable range by the allowable quality specifying means, status of the network server and status of the network. Therefore, the system can be constructed with flexibility with respect to the quality of data and the number of allowable terminals in accordance with demands from the user. In addition, when the network server is overloaded or the network is in poor status, the number of allowable terminals is limited more severely, thereby a service to terminals supported at present is not adversely affected by degraded response of the server. As a result, motion picture data can be reproduced with reliability and qualities of reproduced data are improved.

Figure 27:
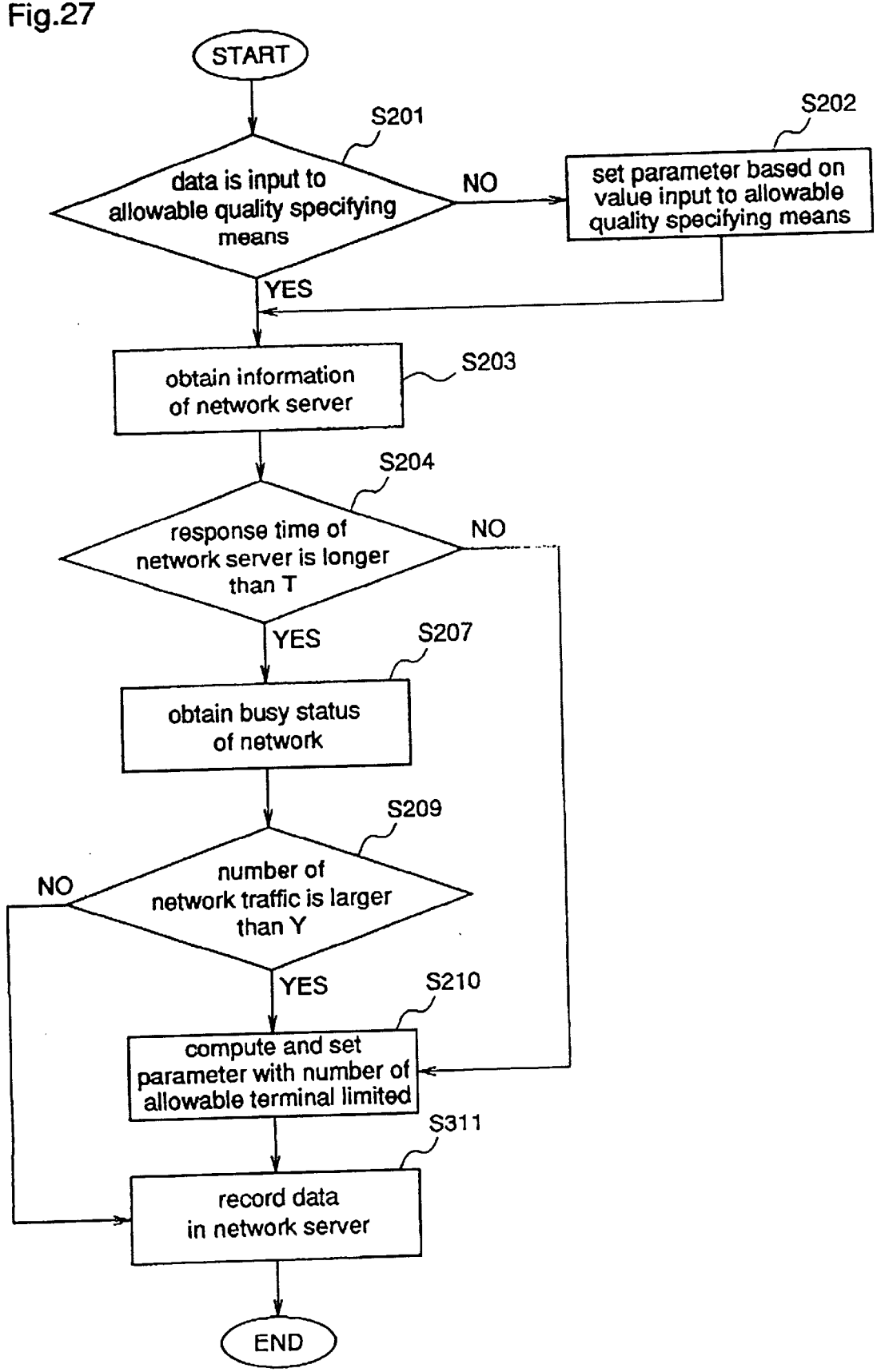
FIG. 27 is a flow chart illustrating a recording operation of the video network server.

In the video network server according to the ninth embodiment as in the fourth embodiment, when data is transferred from the terminal and the data is recorded in a storage device of the server, the number of allowable terminals can be set depending on the situation following a procedure of a flow chart illustrated in FIG. 27. As a result, reliability of recording and qualities of recorded data are improved.

The allowable quality specifying means, the network status obtaining means, the network status decision means, the network server information obtaining means, the network server status decision means, the parameter computing means, and the parameter setting means may be held independently in each terminal, or may be held on another network equipment as a separate apparatus.

Information which is obtained by the network status obtaining means is not limited to the total number of packets, information which is obtained by the network server information obtaining means is not limited to the response time, and information which is input to the allowable quality specifying means is not limited to this illustration.

Embodiment 10

A video network server according to a tenth embodiment of the present invention can adjust time slot management in accordance with a required data transfer rate.

Figure 28:
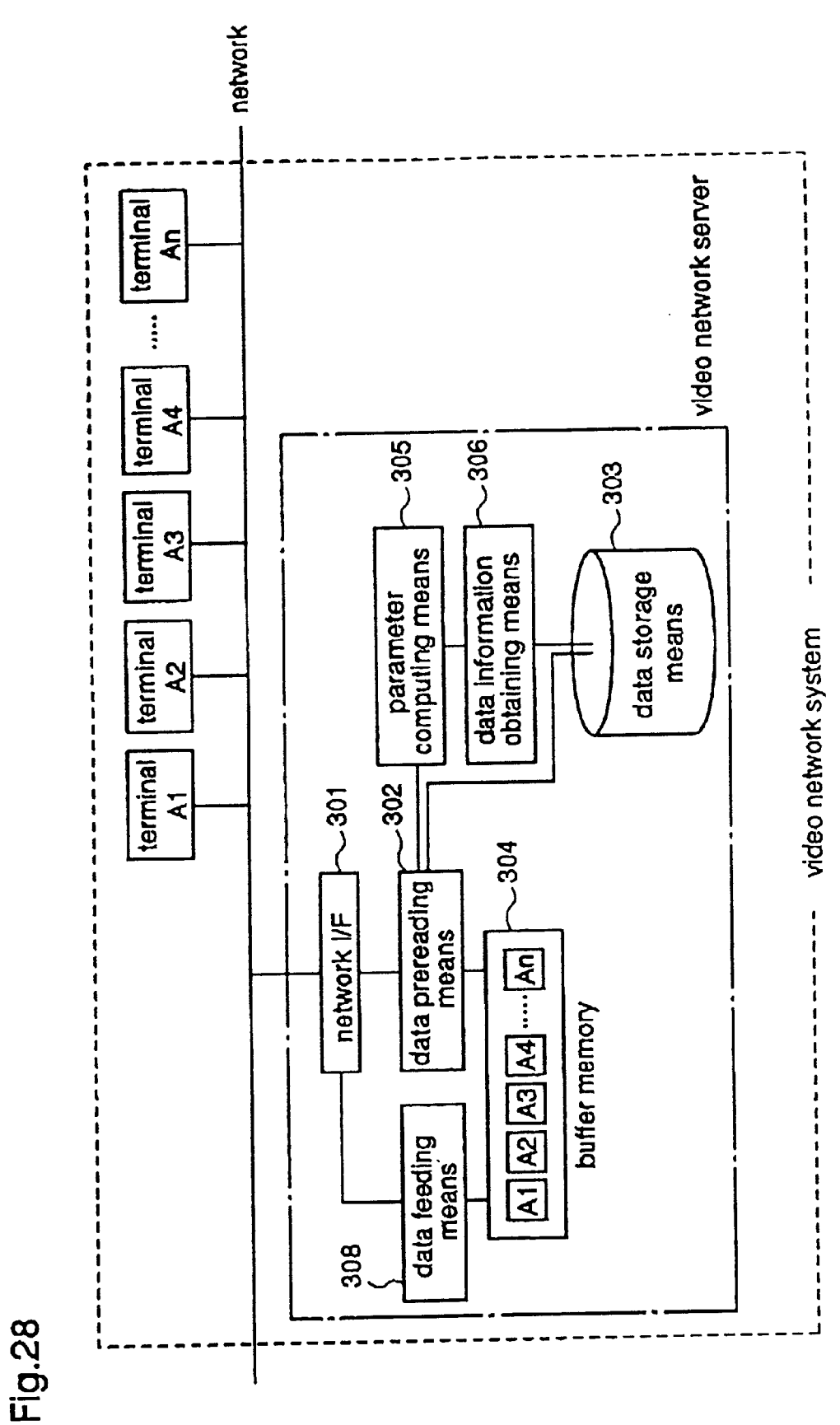
FIG. 28 is a block diagram illustrating a video network server according to a tenth embodiment.

FIG. 28 is a block diagram illustrating a server according to the tenth embodiment.

In the figure, reference numeral 301 designates a network interface through which the video network server is connected to a network. A data storage means 303 is for storing data of the video network server. A buffer memory 304 is for temporarily storing data which is read from the data storage means 303. A data information obtaining means 306 is for obtaining information such as a required transfer rate of data which is requested by the terminal. A parameter computing means 305 is for deciding whether it is possible to read data in half of a time slot size allocated to a terminal in a time slot period or not, on the basis of the required transfer rate which is obtained by the data information obtaining means 306, allocating one time slot size for reading data to the terminal every two periods of a time slot period, and allocating remaining one time slot size in a time slot period which has not been allocated, for another terminal, when it is decided that it is possible to read the data in half of the time slot size. A data prereading means 302 is for reading the data which is requested by the terminal from the data storage means 303 and outputting the data to the buffer memory 304. A data feeding means 308 is for feeding the data which is output to the buffer memory 304 to the terminal.

Figure 29:
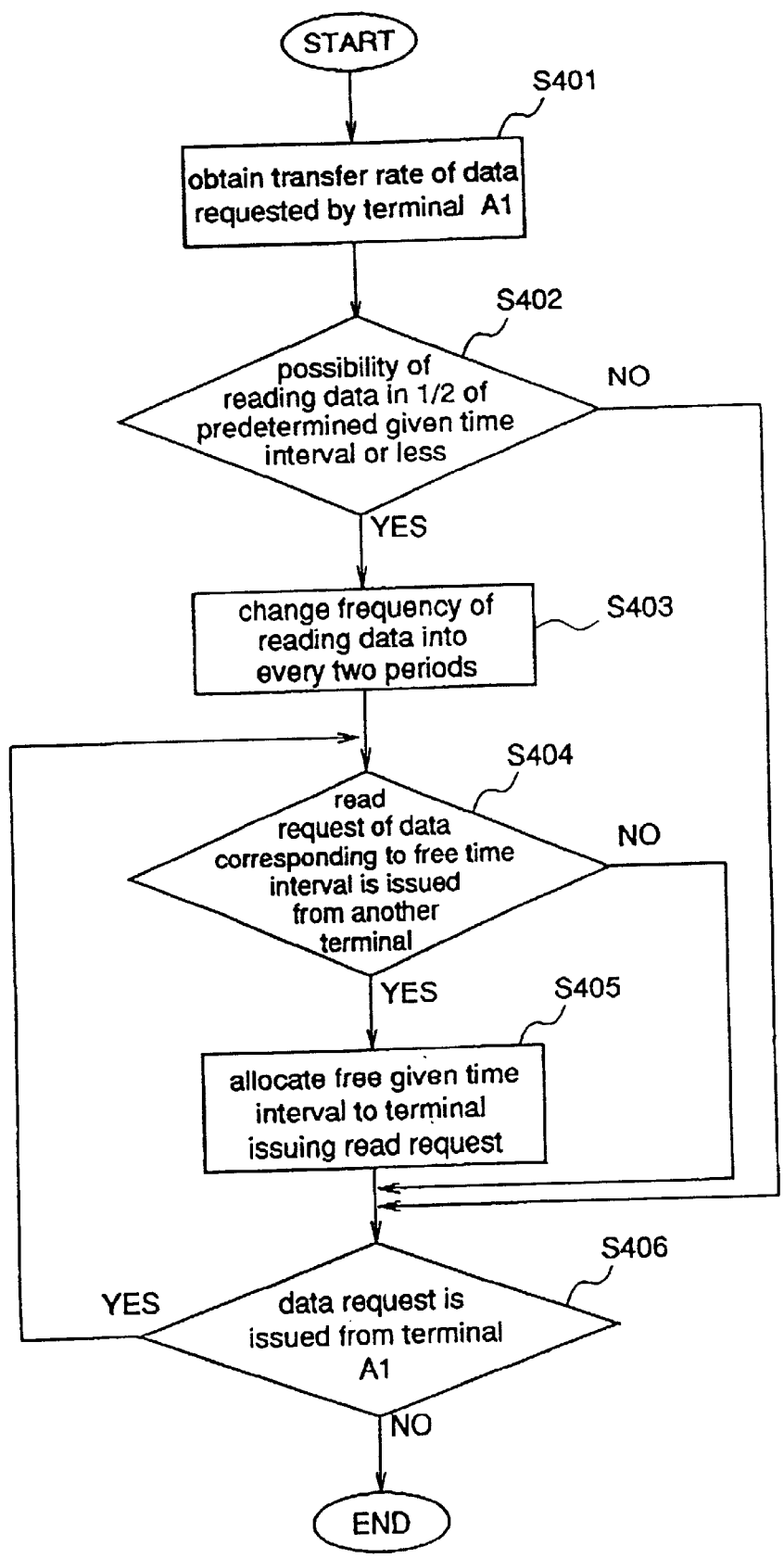
FIG. 29 is a flow chart illustrating an operation of the video network server according to a tenth embodiment of the present invention.
Figure 31:
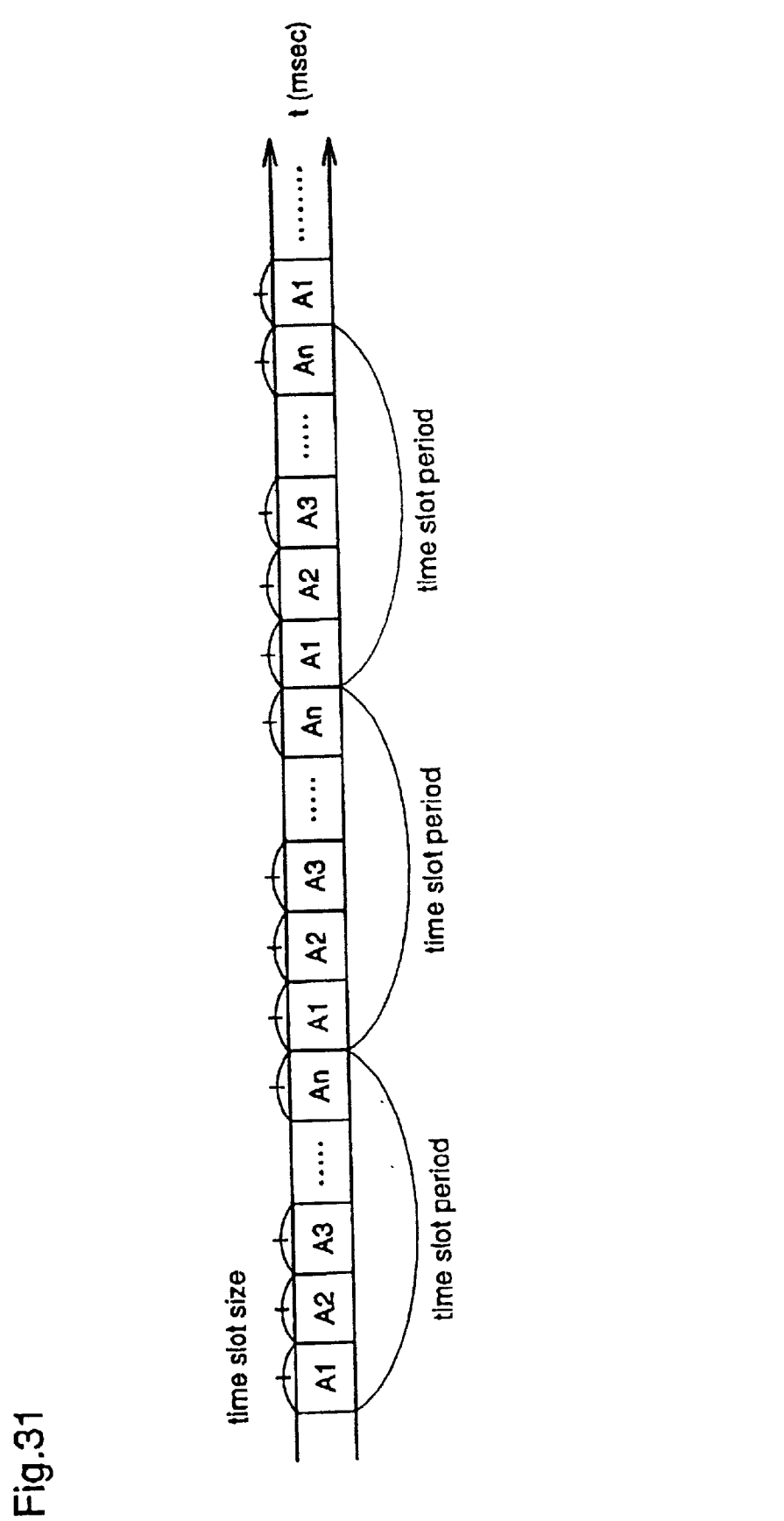
FIG. 31 is a diagram illustrating distribution of time in operating the video network server according to the tenth embodiment of the present invention.
Figure 32:
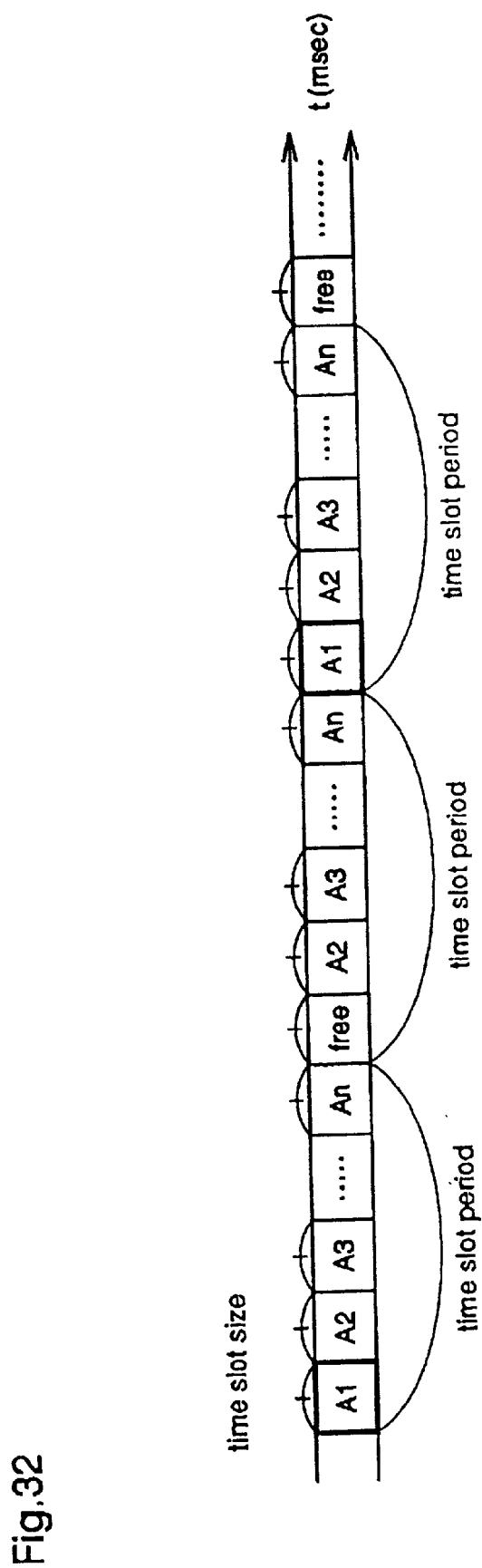
FIG. 32 is a diagram illustrating distribution of time in operating the video network server according to the tenth embodiment of the present invention.
Figure 33:
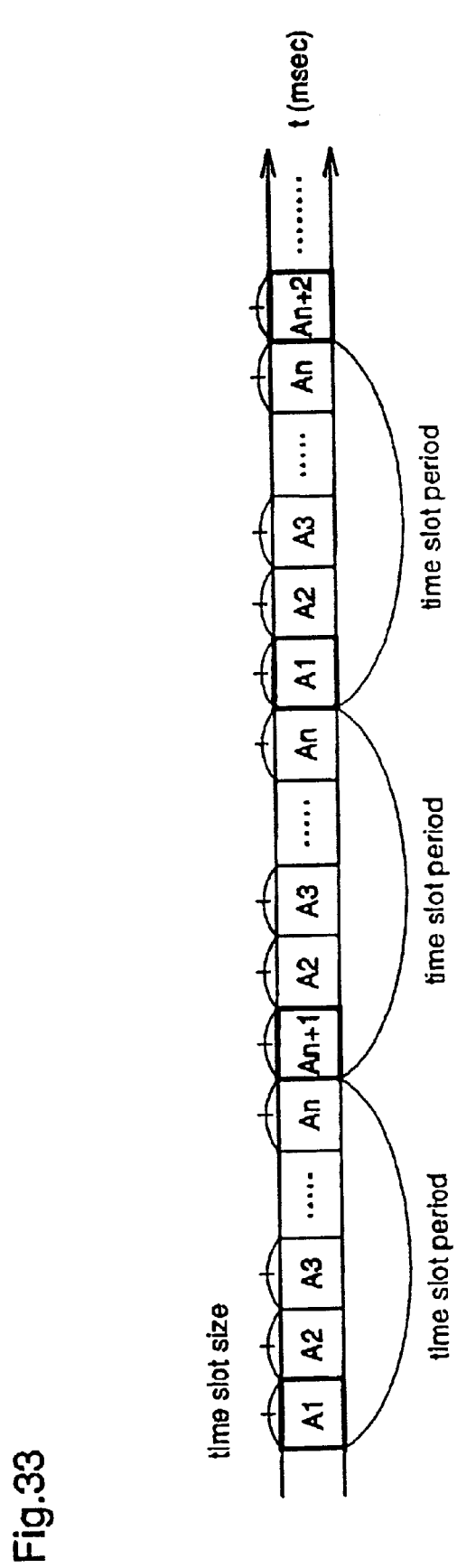
FIG. 33 is a diagram illustrating distribution of time in operating the video network server according to the tenth embodiment of the present invention.
Figure 34:
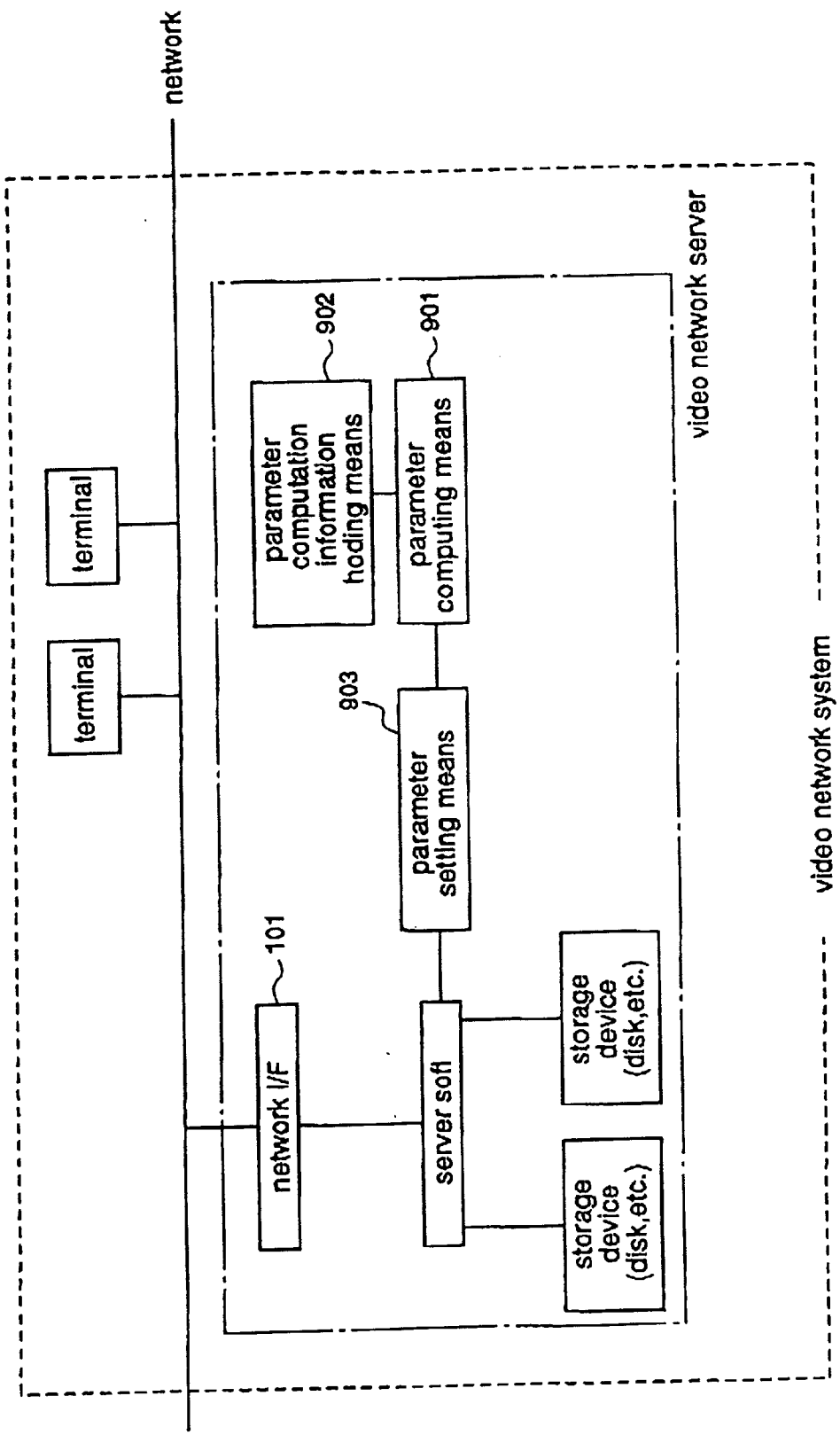
FIG. 34 is a block diagram illustrating a prior art video network server.
Figure 35:
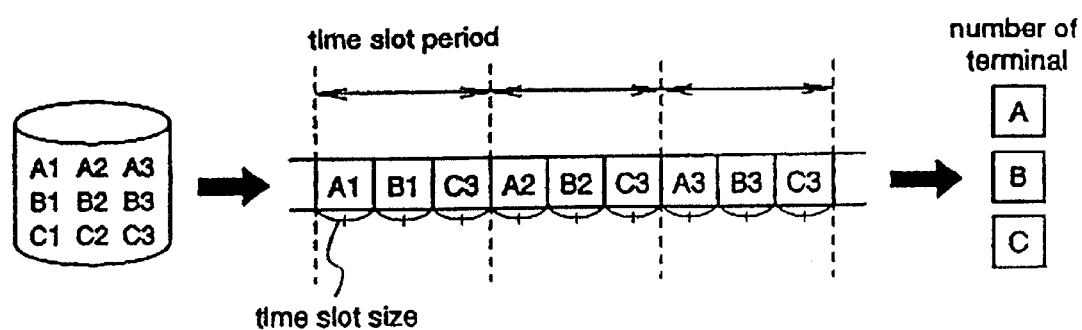
FIG. 35 is a diagram for explaining time slot management of the video network server.

FIG. 29 is a flow chart illustrating on operation of the server of the tenth embodiment. FIG. 30 is a diagram illustrating parameters of the system which is preset in the server of the tenth embodiment. FIGS. 31 to 33 are diagrams illustrating time slot management in an operation of the server of the tenth embodiment.

A description is given of an operation of the video network server according to the tenth embodiment of the present invention with reference to FIGS. 28 to 33.

When data request is issued from the terminal to the server, in step 401, the data information obtaining means 306 obtains information such as a required transfer rate of the data. The required transfer rate is a transfer rate required to reproduce data continuously in transferring data such as a motion picture. For example, the required transfer rate of data which is requested by a terminal A1 is 1.5 Mbps. In step 402, the parameter computing means 305 compares the obtained information with parameters of the system at present. In this case, parameters at present are illustrated in FIG. 30. These parameters are set indicating the following. If data which is requested by n terminals is read continuously for a time of the time slot size (1333/n msec) allocated for the each terminal per 1333 msec of the time slot period, the data can be transferred to each terminal at a transfer rate of 3.0 Mbps, so that it follows that data of required transfer rate which is not higher than 3.0 Mbps can be reproduced continuously at each terminal. In this case, parameters are set so that request of data of 3.0 Mbps may be issued from n terminals per period 1333 msec at the same time. FIG. 31 is a diagram illustrating time slot management in reading data which is supplied to n terminals, where a lateral axis represents a time.

In step 402, a transfer rate of data which is requested by the terminal A1 is 1.5 Mbps, which is compared with 3.0 Mbps (a transfer rate of the system at present), so that it is decided that the data can be read in half of the time slot size which is allocated for the terminal A1 or less, and the parameter computing means 305 computes parameters on assumption that data is read for the terminal A1 every two periods. In step 403, time distribution in reading data is changed from one shown in FIG. 31 to one shown in FIG. 32, so that there is a free time of one time slot size every two periods. That is, in case of data which can be read every two periods, i.e., at a required transfer rate which is not higher than 1.5 Mbps, there is a free time for reading data for a terminal.

When a request is issued from a (n+1)th terminal (a number of terminals which the system may allow is precomputed to be "n") in step 404, a free time interval of one time slot size is allocated for the terminal which issued the request in step 405 if a transfer rate of the terminal which issued the request is not higher than 1.5 Mbps. Time distribution at this time is shown in FIG. 33.

In step 406, it is checked whether a data request is being issued by the terminal A1 or not. As long as the data request is being issued from the terminal A1, steps 404 to 406 are repeated.

For a time of one time slot size every two periods of the time slot period which is allocated for the terminal A1, the data prereading means 302 reads the data which is requested by the terminal A1 from the data storage means 303 to the buffer memory 304, and the data feeding means 308 fetches data from the buffer memory 304 and feeds the data through the network interface 301, via a network, and to the terminal A1.

The video network server of the tenth embodiment adjusts allocating time for a terminal by changing the time slot management in accordance with a transfer rate which is requested described above.

Thus, in accordance with the video network server of the tenth embodiment, the data information obtaining means obtains the required transfer rate of the data which is requested by the terminal; and the parameter computing means compares the obtained required transfer rate with the transfer rate which is assumed by the system; in case of data of required transfer rate which is not higher than half of the assumed data transfer rate, computes parameters so that one time slot size is allocated for transferring the data every two periods of the time slot period and remaining one time slot size is allocated for another terminal every two periods by changing time slot management. Therefore, it is possible to operate the system effectively without free time in a time slot and without using read time.

In the video network server of the tenth embodiment, since the transfer rate of the data which is requested by the terminal is half as high as the assumed transfer rate, a given time interval is allocated every two periods. Alternatively, the given time interval may be allocated every three periods and a transfer rate of a plurality of times may coexist. In this case, the parameter computing means 305 must decide optimum allocation of time interval so that there is free time as little as possible.

In the tenth embodiment, although time distribution for each terminal is performed sequentially in numerical order of terminal such as A1 to An, it is not necessary to perform this in specified order.

It should be noted that parameters preset in the system shown in FIG. 30 are by way of example only and are not limited to these types, nether is a number. Having described the terminal A1 in the tenth embodiment, process is performed for the other terminals A2 to An concurrently with terminal A1.

What is claimed is:

1. A video network server which distributes sound/video image information to a plurality of terminals comprising:
   a network system status obtaining section for obtaining status of a video network system including a video network server, a network and terminals;
   a network system status decision section for deciding the status of the video network system which is obtained by the network system status obtaining section;
   a data obtaining method selecting means for selecting a data obtaining method on the basis of a result which is decided by the network system status decision section; and
   a data obtaining method switching means for performing switching of a data obtaining method while data is being distributed in the network system when the data obtaining method which is selected by the data obtaining method selecting means is different from a data obtaining method at present.

2. The video network server of claim 1 wherein the network system status obtaining section includes a network status obtaining means for obtaining status of the network and the network system status decision section includes a network status decision means for deciding the status of the network which is obtained by the network status obtaining means.

3. The video network server of claim 1 wherein the network system status obtaining section includes a network server information obtaining means for obtaining information of the video network server and the network system status decision section includes a network server status decision means for deciding status of the video network server on the basis of the information of the video network server which is obtained by the network server information obtaining means.

4. A video network server for distributing sound/video image information to a plurality of terminals comprising:
   a network system status obtaining section for obtaining status of a video network system including a video network server, a network and terminals;
   a network system status decision section for deciding the status of the video network system which is obtained by the network system status obtaining section;
   a data obtaining method selecting means for selecting one of an FTP protocol and an NFS protocol data obtaining method on the basis of a result which is decided by the network system status decision section; and
   a data obtaining method switching means for performing switching of a data obtaining method while data is distributed in the video network system when the data obtaining method which is selected by the data obtaining method selecting means is different from a data obtaining method at present.

5. A video network server for distributing sound/video image information to a plurality of terminals comprising:
   a network system status obtaining section for obtaining status of a video network system including a video network server, a network and terminals;
   a network system status decision section for deciding the status of the network system which is obtained by the network system status obtaining section;
   a parameter computing means for computing parameters including a number of terminals which the system may allow in accordance with one of an FTP protocol and an NFS protocol on the basis of a result which is decided by the network system status decision section; and
   a parameter setting means for setting parameters of the system while data is distributed in the network system on the basis of a result which is computed by the parameter computing means.

\* \* \* \* \*